(12) United States Patent
Gandla et al.

(10) Patent No.: US 12,181,721 B2
(45) Date of Patent: Dec. 31, 2024

(54) OPTICAL FIBER CONNECTORS AND METHODS OF CONNECTING OPTICAL FIBERS

(71) Applicant: AFL IG LLC, Duncan, SC (US)

(72) Inventors: Soma Shekar Gandla, Milton Keynes (GB); Asher Leong Raven, Milton Keynes (GB)

(73) Assignee: AFL IG LLC, Duncan, SC (US)

( * ) Notice: Subject to any disclaimer, the term of this patent is extended or adjusted under 35 U.S.C. 154(b) by 162 days.

(21) Appl. No.: 17/858,531

(22) Filed: Jul. 6, 2022

(65) Prior Publication Data

US 2022/0350086 A1    Nov. 3, 2022

Related U.S. Application Data

(63) Continuation of application No. 16/832,913, filed on Mar. 27, 2020, now Pat. No. 11,409,056.

(51) Int. Cl.
*G02B 6/38* (2006.01)
*H01R 13/627* (2006.01)
*H01R 13/633* (2006.01)

(52) U.S. Cl.
CPC ......... *G02B 6/3879* (2013.01); *G02B 6/3825* (2013.01); *G02B 6/3893* (2013.01); *G02B 6/3897* (2013.01); *H01R 13/6272* (2013.01); *H01R 13/6275* (2013.01); *H01R 13/6335* (2013.01)

(58) Field of Classification Search
CPC .. G02B 6/3879; G02B 6/3825; G02B 6/3893; G02B 6/3897; H01R 13/6272; H01R 13/6275; H01R 13/6335
See application file for complete search history.

(56) References Cited

U.S. PATENT DOCUMENTS

| | | | | |
|---|---|---|---|---|
| 5,011,424 | A * | 4/1991 | Simmons | H01R 13/6275 439/352 |
| 5,110,302 | A * | 5/1992 | Kobler | H01R 13/6272 439/357 |
| 6,254,418 | B1 * | 7/2001 | Tharp | H01R 13/6335 439/352 |
| 6,364,685 | B1 * | 4/2002 | Manning | G02B 6/3879 439/357 |
| 7,588,373 | B1 * | 9/2009 | Sato | G02B 6/3893 385/59 |
| 8,152,384 | B2 * | 4/2012 | de Jong | G02B 6/3893 385/59 |

(Continued)

FOREIGN PATENT DOCUMENTS

CN    103703631 A    4/2014
WO   WO2013052070 A1    4/2013

*Primary Examiner* — Peter Radkowski
(74) *Attorney, Agent, or Firm* — Dority & Manning, P.A.

(57) ABSTRACT

A connector for optically connecting an optical fiber to an optical fiber port at a leading edge of the connector, the connector comprising: a housing configured to receive the optical fiber; a latch coupled to the housing and extending from the housing toward the leading edge of the connector; and a handle coupled to the latch, the handle operable to move the latch between locked and unlocked positions with respect to the optical fiber port, wherein moving the handle away from the leading edge of the connector unlocks the latch from the optical fiber port.

20 Claims, 11 Drawing Sheets

(56) References Cited

U.S. PATENT DOCUMENTS

| | | | | |
|---|---|---|---|---|
| 8,465,317 B2* | 6/2013 | Gniadek | | H01R 43/26 439/352 |
| 9,069,149 B2* | 6/2015 | Yu | | G02B 6/4452 |
| 9,599,778 B2* | 3/2017 | Wong | | H01R 13/6335 |
| 9,946,035 B2* | 4/2018 | Gustafson | | G02B 6/3871 |
| 10,139,572 B2* | 11/2018 | Hopper | | G02B 6/3871 |
| 10,156,683 B2* | 12/2018 | Manes | | G02B 6/3878 |
| 10,404,008 B2* | 9/2019 | Miller | | H01R 25/003 |
| 10,547,142 B1* | 1/2020 | Henry | | H01R 12/79 |
| 11,509,095 B2* | 11/2022 | Churnovic | | H01R 13/633 |
| 2006/0105617 A1* | 5/2006 | Padro | | H01R 13/6275 439/484 |
| 2009/0246999 A1* | 10/2009 | Crofoot | | H01R 13/6275 439/352 |
| 2010/0233897 A1* | 9/2010 | Seo | | H01R 13/6272 439/345 |
| 2011/0299814 A1* | 12/2011 | Nakagawa | | G02B 6/38875 385/78 |
| 2012/0149222 A1* | 6/2012 | Wu | | H01R 13/6275 439/155 |
| 2012/0308183 A1* | 12/2012 | Irwin | | G02B 6/3893 385/56 |
| 2014/0205245 A1* | 7/2014 | Gallegos | | G02B 6/38875 385/81 |
| 2014/0270675 A1* | 9/2014 | Yu | | H04Q 1/02 439/535 |
| 2016/0018606 A1* | 1/2016 | Xue | | G02B 6/3879 385/76 |
| 2016/0359273 A1* | 12/2016 | Tanaka | | H01R 13/6335 |
| 2017/0293088 A1* | 10/2017 | Manes | | G02B 6/3825 |
| 2017/0293089 A1* | 10/2017 | Gustafson | | G02B 6/3885 |
| 2017/0293090 A1* | 10/2017 | Hopper | | G02B 6/3879 |
| 2018/0217340 A1* | 8/2018 | Wong | | G02B 6/3893 |
| 2019/0033531 A1* | 1/2019 | Taira | | G02B 6/3831 |
| 2019/0097354 A1* | 3/2019 | Zheng | | H01R 13/6272 |
| 2019/0109414 A1* | 4/2019 | Miller | | H01R 24/20 |
| 2019/0154924 A1* | 5/2019 | Chang | | G02B 6/3825 |
| 2019/0170957 A1* | 6/2019 | Butler | | G02B 6/3878 |
| 2019/0190200 A1* | 6/2019 | Chang | | H01R 13/6593 |
| 2019/0243072 A1* | 8/2019 | Takano | | G02B 6/38875 |
| 2020/0064564 A1* | 2/2020 | Ho | | G02B 6/3887 |

\* cited by examiner

OPTICAL FIBER CONNECTORS AND METHODS OF CONNECTING OPTICAL FIBERS

CROSS-REFERENCE TO RELATED APPLICATIONS

This present application is a continuation of U.S. patent application Ser. No. 16/832,913, filed on Mar. 27, 2020, the disclosure of which is incorporated by reference herein in its entirety.

FIELD

The present disclosure relates to connectors for optical fibers, and in particular, but not exclusively, to connectors for duplex optical fiber cables.

BACKGROUND

In data communications systems, optical fiber systems having a plurality of optical fiber cables are frequently used to connect between communication nodes. Typically, the optical fiber cables include a pair of optical fibers known as duplex optical fiber cables, one for transmitting and one for receiving (typically, the receiving fiber is labeled A and the transmitting fiber is labeled B). The overall effect of the data communications cabling is that the transmitting cables B connect with receiving ports A, and the receiving cables A connect with transmitting ports B. However, during installation, it is not uncommon for the installer to get confused between the transmitting and receiving cables and a crossover can occur such that the transmitting cables B are not connected with receiving port A, and vice versa. For many connector types, installers are prevented from simply unplugging the duplex cable connectors and reinserting them in another orientation because the connectors are unidirectional and therefore can only be inserted into the complementary receiving ports in one orientation. Thus, it is necessary for the installer to replace the existing cable or remove the connecting head from the fibers and effectively remanufacture the cable on site, which is very cumbersome and time consuming.

Another problem with duplex optical fiber cable connectors is that it can be difficult to remove the connector from the receiving port. This is particularly true for panels having a high density of connectors, which means there is limited space around each connector. Thus, it can be difficult for a user to manipulate the locking levers when removing the connector from the panel.

Accordingly, an improved optical fiber connector, particularly for duplex optical fiber cables, is desired.

BRIEF DESCRIPTION

Aspects and advantages of the invention will be set forth in part in the following description, or may be obvious from the description, or may be learned through practice of the invention.

In accordance with one aspect, the present disclosure is directed to a connector including a housing configured to receive an optical fiber and optically connect the optical fiber to an optical fiber port at a leading edge of the connector. The connector comprises a latch coupled to the housing and extending from the housing toward the leading edge of the connector. The connector also comprises a handle coupled to the latch. The handle is configured to move the latch between locked and unlocked positions with respect to the optical fiber port. Moving the handle away from the leading edge of the connector is configured to unlock the latch from the optical fiber port.

In accordance with another aspect, the present disclosure is directed to a connector for an optical fiber. The connector comprises a latch extending from a housing of the connector in a direction toward a leading edge of the connector. The latch is configured to selectively couple the connector to an optical fiber port. At least 25% of a length of the latch lies along a curved line when the latch is unbiased.

In accordance with another aspect, the present disclosure is directed to a method of decoupling a connector from an optical fiber port. The method includes moving a handle of the connector in a direction away from the optical fiber port. The handle is coupled to a latch of the connector. The latch is coupled to a housing of the connector an extends toward a leading edge of the connector. The method further includes removing the connector from the optical fiber port.

In accordance with another aspect, a connector for optically connecting an optical fiber to an optical fiber port defines a first length, $L_1$, as measured between a leading edge and a trailing edge of the connector when the connector is in a locked configuration, and a second length, $L_2$, as measured between the leading edge and the trailing edge of the connector when the connector is in an unlocked configuration, wherein $L_1$ is different than $L_2$.

In accordance with another aspect, a connector assembly for optically connecting an optical fiber to an optical fiber port includes a housing configured to receive the optical fiber. The housing includes a latch configured to selectively couple the housing to the optical fiber port. The connector further includes a boot having a bore configured to receive the optical fiber. Displacing the boot relative to the housing causes the latch to be unlocked from the optical fiber port.

In accordance with another aspect, a method of releasing a connector from an optical fiber port includes applying a biasing force to a boot of the connector in a direction way from a housing of the connector. The housing includes a latch configured to selectively couple the connector to the optical fiber port. Applying the biasing force to the boot causes a length of the connector, as measured by a length between a leading edge of the housing and a trailing edge of the boot, to change. The method further includes removing the connector form the optical fiber port after the latch is transitioned to an unlocked configuration.

In accordance with another aspect, a connector assembly for optically connecting an optical fiber to an optical fiber port can include a housing configured to receive the optical fiber. The housing can include a latch configured to selectively couple the housing to the optical fiber port. The latch can have a curved profile in both locked and unlocked configurations. The radius of curvature of the latch can be greater in the unlocked configuration than the locked configuration. The latch can be biased from the locked configuration to the unlocked configuration upon application of a biasing force along a boot of the connector. More particularly, the latch can move to the unlocked configuration upon application of a biasing force on the boot in a direction generally away from the housing. An intermediary element connecting the boot to the latch can transmit the biasing force to the latch, causing the latch to move to the unlocked configuration upon which the connector can be removed from the optical fiber port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
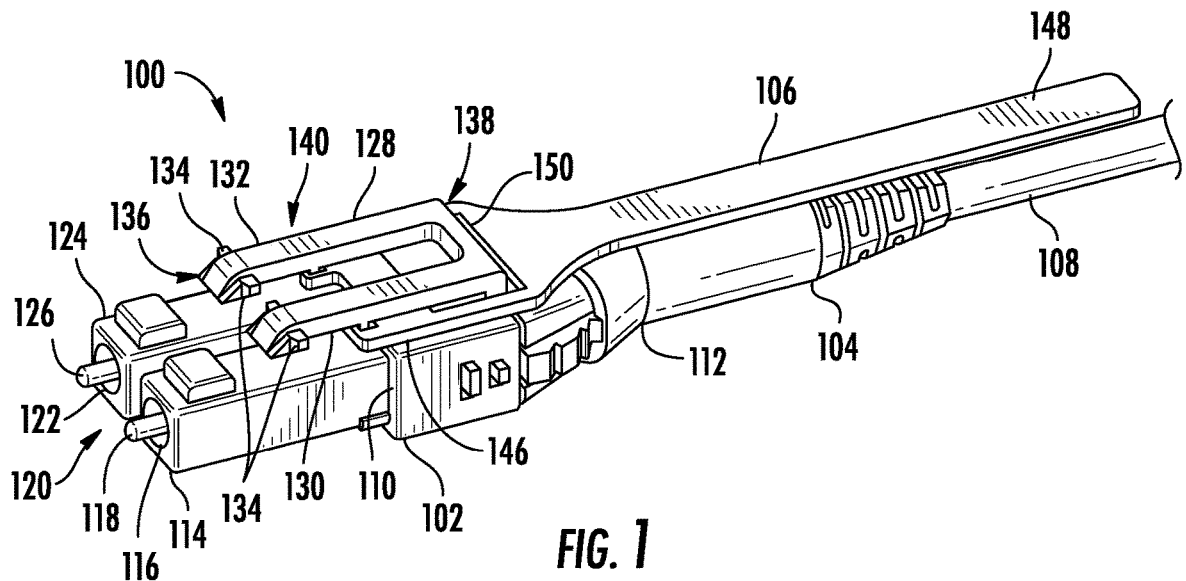
FIG. 1 includes a perspective view of a connector in accordance with one or more embodiments of the present disclosure as viewed in an unbiased state.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
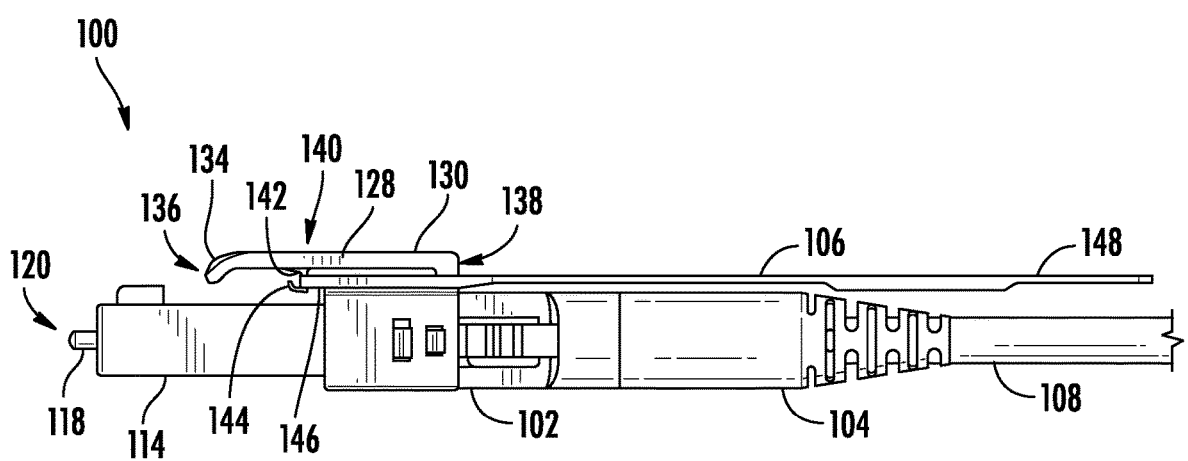
FIG. 2 includes a side view of the connector of FIG. 1 in accordance with one or more embodiments of the present disclosure as viewed in an unbiased state.

Referring now to the Figures, the present disclosure is generally directed to a connector for optical fibers. FIGS. 1 and 2 illustrate an exemplary connector 100 including a housing 102, a boot 104, and a handle 106. The connector 100 may engage with an optical fiber 108 extending from the housing 102 through the boot 104.

In one or more embodiments, the housing 102 can include a plurality of pieces configured to engage with one another to form the housing 102. For instance, the housing 102 can include two or more pieces that snap fit together in a releasable manner via snap fit connectors. The housing 102 can include a trailing end aperture (not illustrated) and leading end aperture(s) 110. A section of optical fiber cable can be disposed within the housing 102 and extend at least partially between the trailing end aperture and the leading end aperture(s) 110. In an embodiment, the optical fiber 108 can be inserted into the housing 102 through the trailing end aperture. The boot 104 can overlay a portion of the optical fiber 108 and a trailing portion 112 of the housing 102. The boot 104 may provide stress relief to the optical fiber 108, preventing undesirable stress loading of the optical fiber 108 at an interface with the housing 102.

The optical fiber 108 can furcate inside the housing 102 into first and second optical fibers (not illustrated). The first optical fiber can exit the housing 102 via a first leading end aperture and the second optical fiber can exit the housing 102 via a second leading end aperture. The first optical fiber may correspond with a receiving fiber (A) and the second optical fiber may correspond with a transmitting fiber (B).

The first optical fiber may extend into a bore 116 formed in a first inner body 114 and the end of the first optical fiber can be connected to a first ferrule 118. The first inner body 114 may protrude from the housing 102 via the first leading end aperture 110 of the housing 102. In an embodiment, the first inner body 114 may be fixed with respect to the housing 102. The first inner body 114 can include, for example, engagement portions (not illustrated) to secure the first inner body 114 to the housing 102. The engagement portions may prevent extrusion of the first inner body 114 from the housing 102 and/or prevent rotation between the first inner body 114 and the housing 102. Moreover, the engagement portions may maintain the first inner body 114 at a fixed relative position with respect to the housing 102.

The first ferrule 118 may protrude out of the bore 116 formed in the first inner body 114. The first ferrule 118 and/or first inner body 114 may generally define a leading edge 120 of the connector 102. The leading edge 120 may be insertable into an optical fiber port (FIG. 9), e.g., part of an optical fiber panel, to permit optical connection between the optical fiber 108 and another optical fiber (not illustrated) contained within or coupled to the panel.

The second optical fiber may extend into a bore 122 formed in a second inner body 124. The end of the second optical fiber can be connected to a second ferrule 126 which protrudes from the bore 122. The second inner body 124 may be fixed with respect to the housing 102. The second inner body 124 can include engagement portions (not illustrated), similar to or different from the engagement portions previously described with respect to the first inner body 114, to secure the second inner body 124 to the housing 102. The engagement portions may prevent extrusion of the second inner body 124 from the housing 102 and/or prevent rotation between the second inner body 124 and the housing 102. Moreover, the engagement portions may maintain the second inner body 124 at a fixed relative position with respect to the housing 102.

In one or more embodiments, the housing 102 and the first and second inner bodies 114 and 124 may be formed from interconnected pieces. That is, for example, the first and second inner bodies 114 and 124 may be integral with the housing 102. Alternatively, the first and second bodies 114 and 124 can include discrete components configured to engage with the housing 102. For example, the first and second bodies 114 and 124 may be engageable with the housing 102, e.g., upon snap fitting two or more pieces of the housing 102 to one another.

Connectors in accordance with one or more embodiments described herein may be capable of reversing polarity. That is, for example, the polarity of the first and second optical fibers, as seen with respect to the position of a latch (described in greater detail below), may be interchangeable. More specifically, the receiving fiber (A) and transmitting fiber (B) can be interchanged. In an embodiment, the receiving fiber (A) and transmitting fiber (B) can be switched relative to the housing 102. For example, the housing 102 can have a removable surface through which the receiving fiber (A) and transmitting fiber (B) can be accessed to allow an operator to change the positions thereof. In another embodiment, the housing 102 can be removed from other components of the connector 100 (e.g., the boot 104) and reinstalled in an inverted orientation (i.e., reverse polarity). The latch (described in greater detail below) can be coupled to the housing 102 (e.g., integral with the housing 102) such that rotation of the housing 102 results in rotation of the latch. Through reversible polarity, the operator may adjust the connector(s) in situ, thereby reducing costs and allowing the operator to carry fewer redundant components.

As discussed above, the connector 100 may further include a latch 128 extending from the housing 102. In an embodiment, the latch 128 can include a first latch 130 and a second latch 132. The first latch 130 can correspond with the first inner body 114 and the second latch 132 can correspond with the second inner body 124. That is, the first latch 130 may extend over a portion of the first inner body 114 and the second latch 132 may extend over a portion of the second inner body 124.

The latch 128 (hereinafter referring to the first and second latches 130 and 132 collectively as the latch 128) may be arranged to releasably lock the connector 100 with a complementary connector device. For example, the connector 100 may be used with an optical fiber port including mating components (not illustrated) configured to receive and secure the connector 100 through one or more locking formations 134 disposed on the latch 128. In the illustrated embodiment, the locking formation(s) 134 include ramped surfaces located adjacent to a leading end 136 of the latch 128. As described in greater detail herein, the leading end 136 of the latch 128 can be spaced apart from the housing 102, permitting the locking formation(s) 134 to move relatively closer and farther away from the housing 102 to lock and unlock the connector 100 with respect to the optical fiber port.

The latch 128 may be engaged with the housing 102 at a trailing end 138 of the latch 128. In an embodiment, the latch 128 may be integral with the housing 102. That is, the latch 128 may be integrally part of the housing 102. In another embodiment, the latch 128 may include one or more discrete components configured to engage with the housing 102.

The leading end 136 of the latch 128 can be spaced apart from the trailing end 138 of the latch 128 by a middle portion 140 of the latch 128. In an embodiment, the middle portion 140 can include a middle portion of the latch 128 (as viewed from a side view) between 1% and 99% of the length of the latch 128, such as between 10% and 90% of the length of the latch 128. The connector 100 in the illustrated embodiment has a relatively straight middle portion 140, as viewed from a side view (FIG. 2), when the latch 128 is in an unbiased state. That is, the middle portion 140 of the latch 128 may be generally planar prior to application of force along the handle 106, as described in greater detail herein.

The latch 128 can generally extend from the housing 102 in a direction toward the leading edge 120 of the connector 100. For example, the trailing end 138 of the latch 128 may extend from the housing 102 and at least part of the middle portion 140 can be oriented in a direction generally toward the leading edge 120 of the connector 100. Thus, the leading end 136 of the latch 128 may be disposed at a position closer to the leading edge 120 of the connector 100 than the trailing end 138 of the latch 128. In an embodiment, the latch 128 can be cantilevered.

In one or more embodiments, the latch 128 can further include a handle engagement member 142 forming an interface configured to engage with the handle 106. In an embodiment, the handle engagement member 142 may form a releasable interface with the handle 106. In such a manner, the handle 106 can be selectively removable from the latch 128. In certain instances, the discrete handle 106 may permit easier formation of the connector 100 by allowing more complex connector geometry otherwise not possible in certain formation processes, e.g., molding. In the illustrated embodiment, the handle engagement member 142 includes a retention member 144, e.g., a lip, configured to maintain engagement between the handle 106 and the handle engagement member 142. In another embodiment, the handle 106 can be integrally formed with the housing 102, such as at the latch 128.

Figure 8:
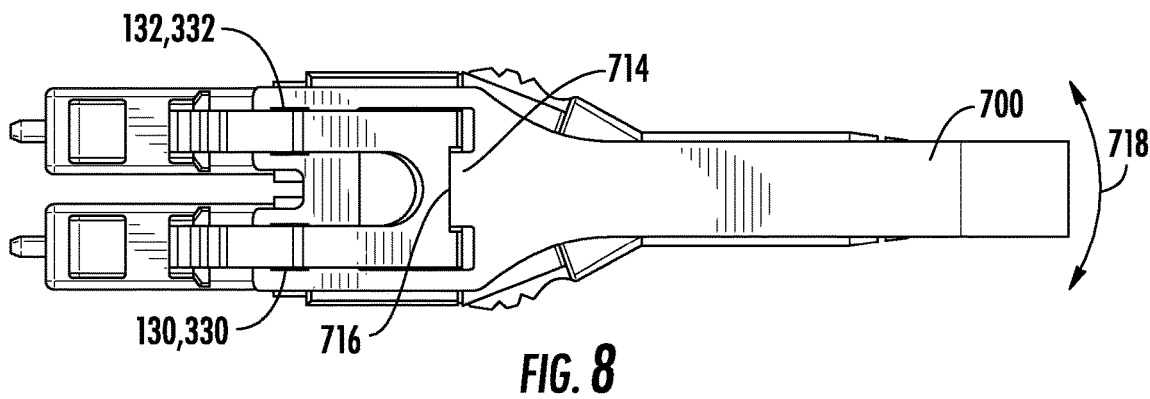
FIG. 8 includes a top view of a connector in accordance with one or more embodiments of the present disclosure.

The handle 106 may extend between a latch engagement end 146 and a pull end 148. The latch engagement end 146 can include one or more openings 150 configured to align with the latch 128 and other components of the housing 102 to permit locking and unlocking operations as described in greater detail herein. The handle 106 may have a variable profile, e.g., taper, between the latch engagement end 146 and the pull end 148. In an embodiment, the handle 106 can define a taper profile, as viewed from a top view (e.g., FIG. 8), similar to the taper profile of the connector 100.

In an embodiment, one or more indicia can be included on the handle 106 to indicate, for example, which direction to pull the handle 106 to unlock the connector 100 from the optical fiber port.

Figure 3:
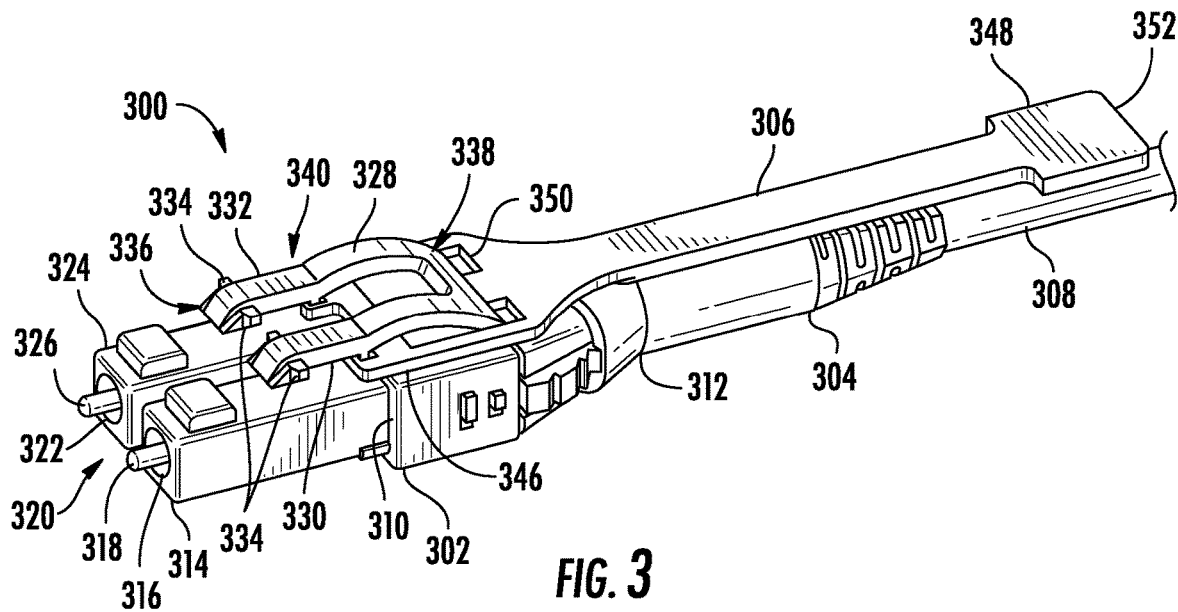
FIG. 3 includes a perspective view of a connector in accordance with one or more embodiments of the present disclosure as viewed in an unbiased state.
Figure 4:
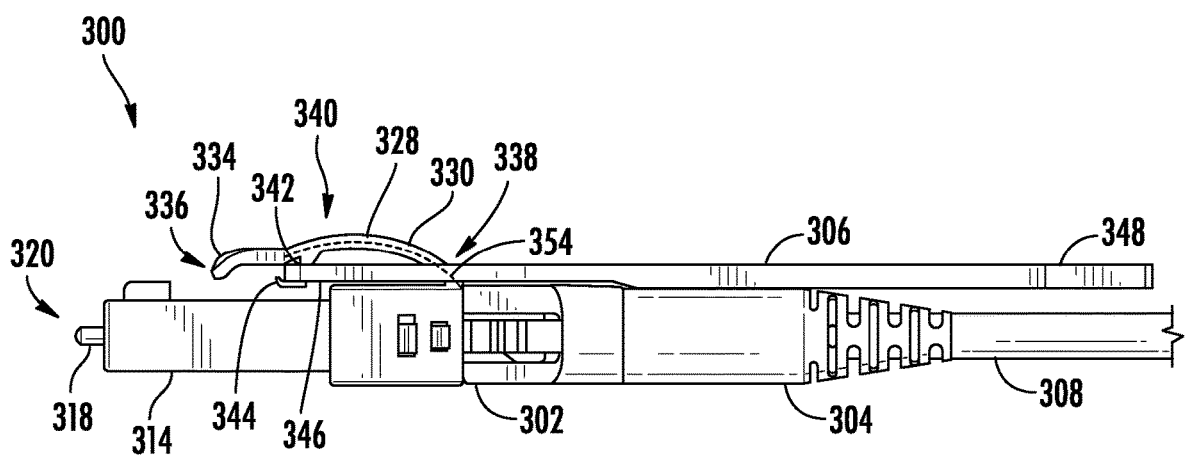
FIG. 4 includes a side view of the connector of FIG. 3 in accordance with one or more embodiments of the present disclosure as viewed in an unbiased state.

FIGS. 3 and 4 illustrate an embodiment of a connector 300. The connector 300 can have any number of similar or different features as compared to the connector 100 previously described with respect to FIGS. 1 and 2. For example, the connector 300 may include a housing 302, a boot 304, and a handle 306. The connector 300 may engage with an optical fiber 308.

In one or more embodiments, the housing 302 can include a plurality of pieces configured to engage with one another to form the housing 302. For instance, the housing 302 can include two or more pieces that snap fit together in a releasable manner via snap fit connectors. The housing 302 can include a trailing end aperture (not illustrated) and first and second leading end apertures 310. A section of optical fiber cable can be disposed within the housing 302 and extend at least partially between the trailing end aperture and the first and second leading end apertures 310. The optical fiber 308 can be inserted into the housing 302 through the trailing end aperture. The boot 304 can overly a portion of the optical fiber 308 and a trailing portion 312 of the housing 302.

The optical fiber 308 can furcate inside the housing 302 into first and second optical fibers (not illustrated). The first optical fiber can exit the housing 302 via the first leading end aperture 310 and the second optical fiber can exit the housing 302 via the second leading end aperture 310. The first optical fiber may correspond with a receiving fiber (A) and the second optical fiber may correspond with a transmitting fiber (B).

The first optical fiber may be threaded into a bore 316 formed in a first inner body 314 and the end of the first optical fiber can be connected to a first ferrule 318. The first inner body 314 may protrude from the housing 302 via the first leading end aperture 310. The first inner body 314 may be fixed with respect to the housing 302. The first inner body 314 can include engagement portions (not illustrated) to secure the first inner body 314 to the housing 302. The engagement portions may prevent extrusion of the first inner body 314 from the housing 302 and/or prevent rotation between the first inner body 314 and the housing 302. Moreover, the engagement portions may maintain the first inner body 314 at a fixed relative position with respect to the housing 302.

The first ferrule 318 may protrude out of the bore 316 formed in the first inner body 314. The first ferrule 318 and/or first inner body 314 may generally define a leading edge 320 of the connector 302. The leading edge 320 may be insertable into an optical fiber port (FIG. 9), e.g., part of an optical fiber panel, to permit optical connection between the optical fiber 306 and another optical fiber (not illustrated).

The second optical fiber may be threaded into a bore 322 formed in a second inner body 324. The end of the second optical fiber can be connected to a second ferrule 326 which protrudes from the bore 322. The second inner body 324 may be fixed with respect to the housing 302. The second inner body 324 can include engagement portions (not illustrated), similar to or different from the engagement portions previously described with respect to the first inner body 314, to secure the second inner body 324 to the housing 302. The engagement portions may prevent extrusion of the second inner body 324 from the housing 302 and/or prevent rotation between the second inner body 324 and the housing 302. Moreover, the engagement portions may maintain the second inner body 324 at a fixed relative position with respect to the housing 302.

In certain instances, the housing 302 may include the first and second inner bodies 314 and 324. That is, for example, the first and second inner bodies 314 and 324 may be integral with the housing 302. Alternatively, the first and second bodies 314 and 324 can include discrete components configured to engage with the housing 302. For example, the first and second bodies 314 and 324 may be engageable with the housing 302 upon snap fitting two or more pieces of the housing 302 to one another.

Like the connector 100 illustrated in FIGS. 1 and 2, the connector 300 may further include a latch 328 extending from the housing 302. In an embodiment, the latch 328 can include a first latch 330 and a second latch 332. The first latch 330 can correspond with the first inner body 314 and the second latch 332 can correspond with the second inner body 324. That is, the first latch 330 may extend over a portion of the first inner body 314 and the second latch 332 may extend over a portion of the second inner body 324.

The latch 328 (hereinafter referring to the first and second latches 330 and 332 collectively as the latch 328) may be arranged to releasably lock the connector 300 with a complementary connector device. For example, the connector 300 may be used with an optical fiber port including mating components (not illustrated) configured to receive locking formation 334 disposed on the latch 328. In the illustrated embodiment, the locking formation 334 includes a ramped surface located adjacent to a leading end 336 of the latch 328. The leading end 336 of the latch 328 can be spaced apart from the housing 302, thereby permitting the locking formation 334 to move relatively closer and farther away from the housing 302 to lock and unlock with the optical fiber port.

The latch 328 may be engaged with the housing 302 at a trailing end 336 of the latch 328. In an embodiment, the latch 328 may be integral with the housing 302 or a component associated therewith. That is, the latch 328 may be part of the housing 302. In another embodiment, the latch 328 may include one or more discrete components configured to engage with the housing 302.

The leading end 336 of the latch 328 can be spaced apart from the trailing end 338 of the latch 328 by a middle portion 340 of the latch 328. The latch 328 can generally extend from the housing 302 in a direction toward the leading edge 320 of the connector 300. That is, for example, the trailing end 338 of the latch 328 may extend from the housing 302 with the middle portion 340 oriented in a direction generally toward the leading edge 320 of the connector 300. In such a manner, the leading end 336 of the latch 328 can be closer to the leading edge 320 of the connector 300 than the trailing end 338 of the latch 328.

In one or more embodiments, the latch 328 may further include a handle engagement member 342 forming an interface with the handle 306. In an embodiment, the handle engagement member 342 may form a releasable interface with the handle 306. In such a manner, the handle 306 can be selectively removed from the latch 328. In an embodiment, use of a discrete handle 306 may permit easier formation of the connector 300 by allowing use of more complex geometry during formation, e.g., molding, processes. In the illustrated embodiment, the handle engagement member 342 includes a retention member 344, e.g., a lip, configured to maintain engagement between the handle 306 and the latch 328.

The handle 306 may include a latch engagement end 346 and a pull end 348. The latch engagement end 346 can include one or more openings 350 configured to align with the latch 328 and other components of the housing 302 so as to permit locking and unlocking operations as described in greater detail herein. The pull end 348 of the handle 306 can include a gripping area 352 configured for easier user grasp when pulling on the handle 306.

The latch 328 in FIGS. 3 and 4 is illustrated in an unbiased state as seen without application of external force applied to the latch 328. Such configuration may be present when the connector 300 is uncoupled from other components, e.g., optical fiber ports. In one or more embodiments herein, the terms "biased" and "unbiased" may be used to refer to relative positions of the latch 128 or 328 when force is applied thereon, e.g., through the handle 106 or 306. When force is applied on the handle 106 or 306, the latch 128 or 328 may be considered in a biased state. Upon termination of force along the handle 106 or 306, the latch 128 or 328 may return to an unbiased state. In a particular embodiment, the latch 128 or 328 may further define a third state, e.g., a locked state, where the latch 128 or 328 is coupled with components, e.g., optical fiber ports. The third state may be between the biased and unbiased states. That is, for example, the component, e.g., the optical fiber port, may provide slight biasing pressure against the latch 128 or 328 preventing full rebound from the biased state to the unbiased state even upon termination of force along the handle 106 or 306. In the unbiased state, the latch 128 or 328 may be in a locked position relative to the component, e.g., the optical fiber port. In the biased state, the latch 128 or 328 may be in an unlocked position relative to the component, i.e., the latch 128 or 328 may be removable from the component.

In one or more embodiments, at least a portion of the latch 328 can lie along a curved line 354, as viewed from a side view, when the latch 328 is in the unbiased state. For instance, in one or more embodiments at least part of the middle portion 340 of the latch 328 can lie along the curved line 354. In an embodiment, at least 25% of a length of the latch 328 lies along the curved line 354 when the latch 328 is unbiased, such as wherein at least 35% of the length of the latch 328 lies along the curved line 354 when the latch 328 is unbiased, such as wherein at least 40% of the length of the latch 328 lies along the curved line 354 when the latch 328 is unbiased, such as wherein at least 45% of the length of the latch 328 lies along the curved line 354 when the latch 328 is unbiased, such as wherein at least 50% of the length of the latch 328 lies along the curved line 354 when the latch 328 is unbiased, such as wherein at least 60% of the length of the latch 328 lies along the curved line 354 when the latch 328 is unbiased, such as wherein at least 70% of the length of the latch 328 lies along the curved line 354 when the latch 328 is unbiased, such as wherein at least 75% of the length of the latch 328 lies along the curved line 354 when the latch 328 is unbiased, such as wherein at least 80% of the length of the latch 328 lies along the curved line 354 when the latch 328 is unbiased, such as wherein at least 90% of the length of the latch 328 lies along the curved line 354 when the latch 328 is unbiased. In an embodiment, the curved line 354 can represent a best-fit curved line associated with a curvature of the latch 328 or a portion thereof.

In one or more embodiments, the curved line 354 can define a radius of curvature, $R_1$ (FIG. 6A), as measured when the latch 328 is in an unbiased state. By way of example, $R_1$ may be less than 4 inches (in), such as less than 3 in, such as less than 2 in, such as less than 1.75 in, such as less than 1.5 in, such as less than 1.25 in, such as less than 1 in, such as less than 0.75 in, or such as less than 0.5 in. The length or the unbiased radius of curvature, $R_1$, of the latch 328 may affect the force required to unlock the latch 328 from an optical fiber port, as described in greater detail herein.

In one or more embodiments, the latch 328 may conform to the curved line 354 along the entire trailing end 338 and at least part of the middle portion 340 of the latch 328. That is, the latch 328 may define a continuously curved profile, as measured from the housing 302 through at least part of the middle portion 340. In an embodiment, the locking formation 334 can lie along a portion of the latch 328 that does not lie along the curved line 354 to permit use of the latch 328 with existing optical fiber ports having predefined engagement structure shapes and designs.

Figure 5:
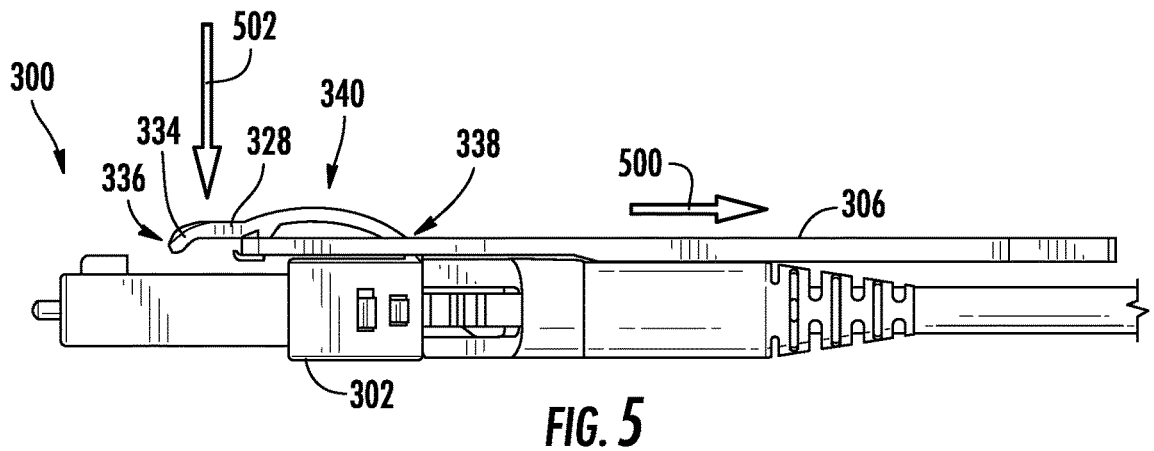
FIG. 5 includes a side view of the connector of FIGS. 3 and 4 in accordance with one or more embodiments of the present disclosure.

FIG. 5 illustrates a side view of the connector 300 with an arrow 500 indicating a pull direction for the handle 306 when unlocking the connector 300 from an optical fiber port, and an arrow 502 indicating a responsive deformation direction of the leading end 336 of the latch 328 in response to pulling the handle 306. To decouple the connector 300 from the optical fiber port, an operator can pull on the handle 306 in the direction indicated by arrow 500. Deflection of the latch 328, e.g., the middle portion 340 and trailing end 338, can cause downward deflection of the leading end 336, permitting the locking formation 334 to clear a mating component (not illustrated) of the optical fiber port. Downward deflection, as used with respect to FIG. 5 is intended to refer to deflection in a direction toward the housing 302.

Curvature of the latch 328 may reduce the force required in the direction indicated by arrow 500 to move the latch 328 from the locked position to the unlocked position. For instance, the force required to unlock the latch 128 illustrated in FIGS. 1 and 2 may be approximately 30 Newtons (N) whereas a similar latch having a curved profile (e.g., FIGS. 3 and 4) may unlock upon application of a force of approximately 10 N.

Figure 6A:
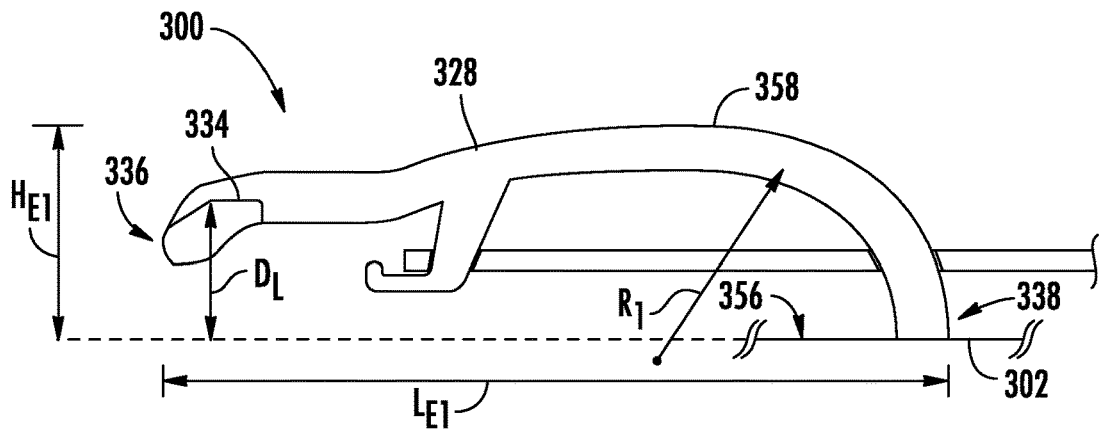
FIG. 6A includes an enlarged view of a latch of the connector of FIGS. 3 to 5 in an unbiased state as seen in accordance with one or more embodiments of the present disclosure.
Figure 6B:
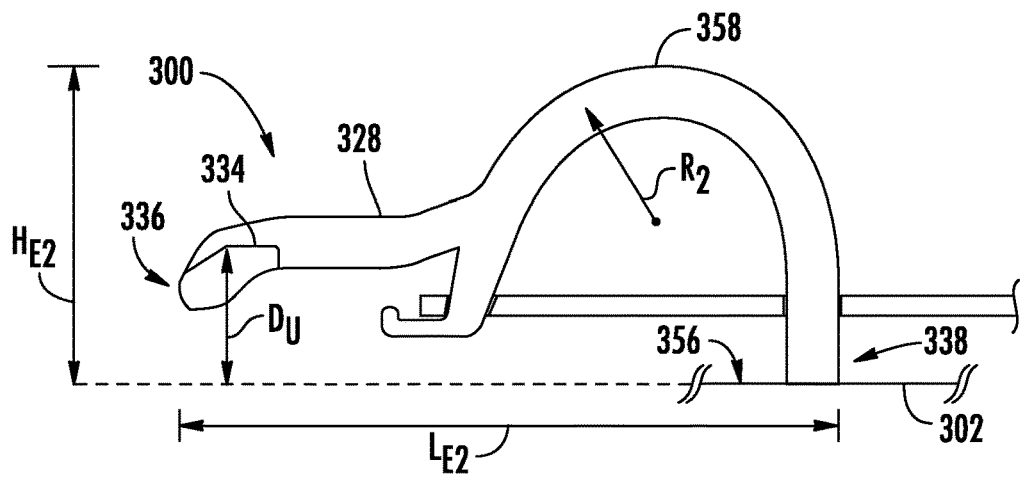
FIG. 6B includes an enlarged view of the latch of the connector of FIG. 6A in a biased state as seen in accordance with one or more embodiments of the present disclosure.

FIG. 6A illustrates the connector 300 in a locked position, e.g., when engaged with mating components of an optical fiber port. It should be understood that the locked position may correlate with an unbiased state of the latch 328. Alternatively, the locked position may include slight deflection of the latch 328 provided by the mating component of the optical fiber port but less biasing, e.g., along arrow 502 (FIG. 5), than in a biased state, e.g., when the latch 328 is biased to install or remove the connector 300 from the optical fiber port. FIG. 6B illustrates the connector 300 in an unlocked position, i.e., permitting an operator to remove the connector 300 from the optical fiber port.

In the locked position (FIG. 6A), the latch 328 defines a first aspect ratio, as measured by an effective length, $L_{E1}$, of the latch 328 relative to an effective height, $H_{E1}$, of the latch 328. In the unlocked position (FIG. 6B), the latch 328 defines a second aspect ratio, as measured by the effective length, $L_{E2}$, of the latch 328 relative to the effective height, $H_{E2}$, of the latch 328. The first aspect ratio may be defined by Equation (1).

$$\frac{L_{E1}}{H_{E1}} = \text{First Aspect Ratio} \quad \text{Equation (1)}$$

The second aspect ratio may be defined by Equation (2).

$$\frac{L_{E2}}{H_{E2}} = \text{Second Aspect Ratio} \quad \text{Equation (2)}$$

Effective lengths of the latch 328, $L_{E1}$ and $L_{E2}$, may be measured by the distance between opposite ends of the latch 328, e.g., between the leading end 336 and trailing end 338 of the latch 328. Effective heights of the latch 328, $H_{E1}$ and $H_{E2}$, may be measured by the distance between a nearest major surface 356 of the housing 302, or a best fit plane relative thereto, and a farthest point 358 of the latch 328, as measured perpendicular to the major surface 356 of the housing 302.

As the handle 306 is pulled in the direction indicated by arrow 500 in FIG. 5, the effective length of the latch 328 may decrease while the effective height of the latch 328 may increase. In this regard, the aspect ratio of the latch 328 may decrease as the latch 328 is moved from the locked position to the unlocked position.

Moreover, a radius of curvature of the latch 328 may change during transition between the locked position and the unlocked position. For example, the latch 328, or a portion thereof, may define a first radius of curvature, $R_1$, as measured in the locked position (FIG. 6A), and a second radius of curvature, $R_2$, as measured in the unlocked position (FIG. 6B). In an embodiment, $R_1$ can be greater than $R_2$. For instance, $R_1$ may be at least 1.01 $R_2$, such as at least 1.05 $R_2$, such as at least 1.1 $R_2$, such as at least 1.2 $R_2$, such as at least 1.3 $R_2$, such as at least 1.4 $R_2$, or such as at least 1.5 $R_2$. In another embodiment, $R_1$ may be no greater than 10 $R_2$, such as no greater than 7.5 $R_2$, or no greater than 5 $R_2$.

As the latch 328 deforms between the locked and unlocked positions, a distance between the locking formation 334 and the housing 302 may change. For instance, in a locked position the locking formation 334 can define a locked distance, DL, as measured by a distance of the locking formation 334 from the nearest major surface 356 of the housing 302 when the latch 328 is in the locked position, greater than an unlocked distance, Du, as measured by a distance of the locking formation 334 from the nearest major surface 356 of the housing 302 when the latch 328 is in the unlocked position. The locked and unlocked distances, DL and Du, can be configured such that the connector 300 may be selectively secured and decoupled from the optical fiber port.

Figure 7:
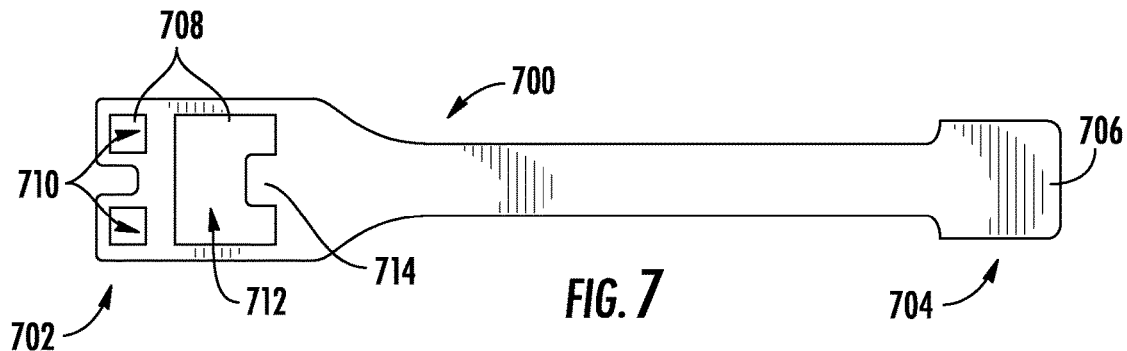
FIG. 7 includes a top view of a handle of a connector in accordance with one or more embodiments of the present disclosure.

FIG. 7 illustrates a top view of a handle 700 of a connector. The handle 700 can include features similar to the handles 106 or 306 previously described. In an embodiment, the handle 700 has a latch engagement end 702 and a pull end 704 with a gripping area 706 configured to facilitate easier gripping of the handle 700.

The handle 700 may include one or more openings 708 configured to align with the latch, e.g., latch 128 or latch 328, and other components of the housing, e.g., housing 102 or 302. The openings 706 can include one or more engagement openings 710, configured to engage with the handle engagement member, e.g., handle engagement member 142 or 342, and one or more latch opening 712 configured to receive the latch, e.g., latch 128 or 328, therethrough. A tab 714 may extend into the latch opening 712. The tab 714 may be configured to extend into a gap between the first and second latches 130 and 132 or 330 and 332. For example, referring to FIG. 8, the tab 714 may extend into the gap 716 between the first and second latches 130 and 132 or 330 and 332. The tab 714 may prevent torsional misalignment of the handle 700 in a lateral direction, e.g., along line 718, and maintain the handle 700 properly seated with respect to the rest of the connector.

Figure 9A:
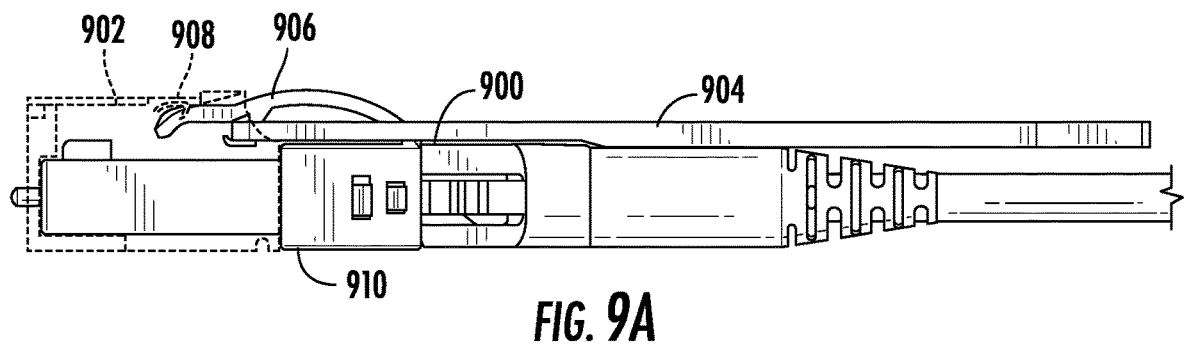
FIG. 9A includes a side view of a connector coupled with an optical fiber port in accordance with one or more embodiments of the present disclosure.
Figures 9B, 10:
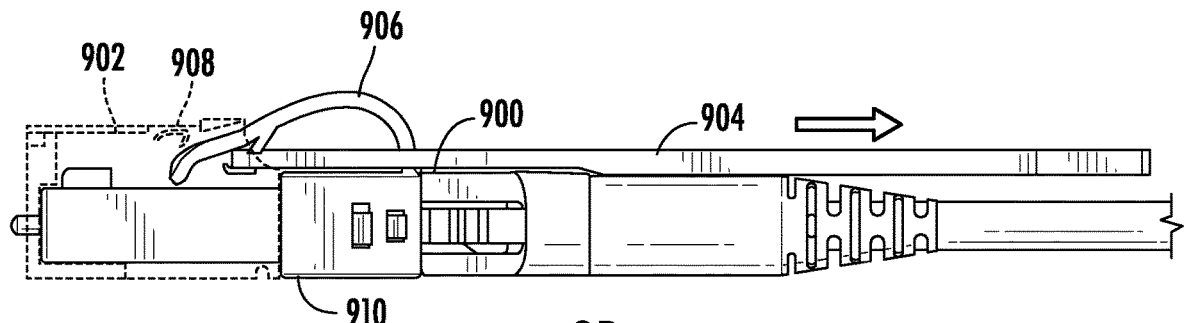
FIG. 9B includes a side view of the connector of FIG. 9A in a biased state for removal from the optical fiber port in accordance with one or more embodiments of the present disclosure.
FIG. 10 includes a method of decoupling a connector from an optical fiber port in accordance with one or more embodiments of the present disclosure.

FIG. 9A illustrates a connector 900 in accordance with one or more embodiments described herein coupled with an optical fiber port 902. FIG. 9B illustrates the connector 900 with force applied to the connector through the handle 904 to bias the locking feature, e.g., the latch 906, to an unlocked position, permitting removal of the connector 900 from the optical fiber port 902. More specifically, applying force through the handle 904 can deflect the latch 906 to clear mating components 908 within the optical fiber port 902. In an embodiment, a portion of the handle 904 can extend into the optical fiber port 902. The latch 906 of the connector 900 can engage with mating components 908 of the optical fiber port 902 and selectively secure the connector 900 to the optical fiber port 902. As the handle 904 is pulled in a direction away from the optical fiber port 902, the latch 906 can deflect downward, e.g., toward a housing 910 of the connector 900, releasing the latch 906 from the mating components 908 of the optical fiber port 902 and permitting removal of the connector 900 from the optical fiber port 902.

It is noted that the profile change of the curvature of the latch 906 illustrated in FIGS. 9A and 9B is exemplary only. In certain instances, the latch 906 can deform primarily at one end thereof, along the middle portion, or a combination thereof. Among other things, the resulting profile change of the latch 906 may be associated with the location of the handle engagement member 142 or 342, the design of the handle engagement member 142 or 342, the shape of the latch 906, the design of the handle 904, or any combination thereof. Certain profile designs may be particularly suitable for different optical fiber ports 902 and can be selected accordingly.

FIG. 10 illustrates an exemplary method 1000 of decoupling a connector from an optical fiber port. The method 1000 can include a step 1002 of moving a handle of the connector in a direction away from the optical fiber port. The handle can be coupled to a latch of the connector. The latch can be coupled to a housing of the connector and can extend toward a leading edge of the connector. In an embodiment, moving the handle can cause an aspect ratio of the latch, as previously described herein, to decrease. In another embodiment, moving the handle away from the optical fiber port can cause a radius of curvature of the latch to decrease. In a further embodiment, moving the handle can cause the middle portion of the latch to move in a direction away from the housing (e.g., FIGS. 6A and 6B). The method 1000 can further include a step 1004 of removing the connector from the optical fiber port. In an embodiment, the method 1000 can also include reattaching the connector to the optical fiber port by inserting the connector into the optical fiber port until a locking formation of the connector engages with a mating component of the optical fiber port. The latch may automatically move to a locked position upon engagement of the locking formation with the mating component.

Figure 11:
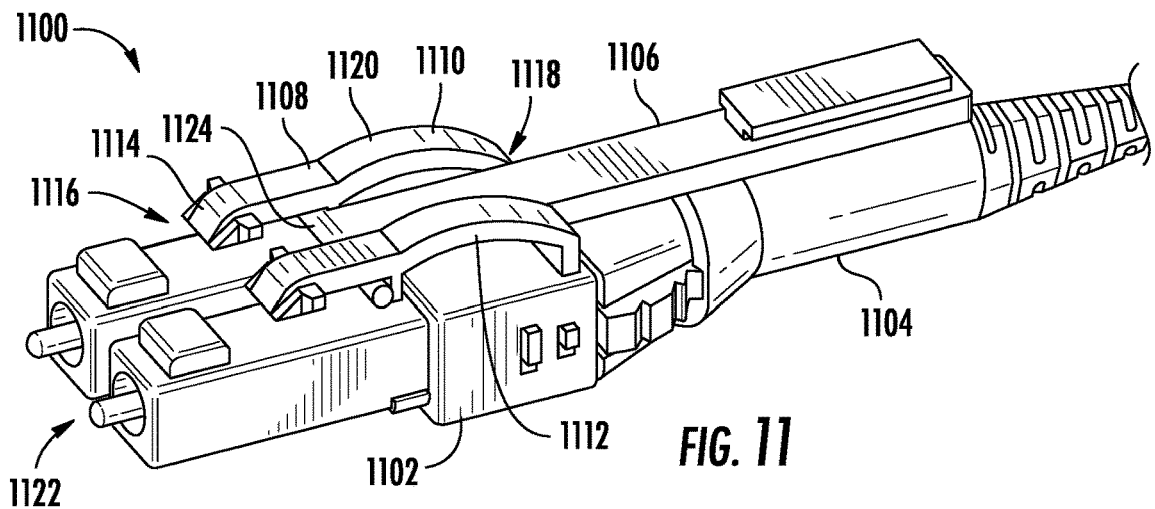
FIG. 11 includes a perspective view of a connector in accordance with one or more embodiments of the present disclosure.

In an embodiment, the connector can be biased from a locked configuration to an unlocked configuration by applying a biasing force along the boot of the connector. For example, FIG. 11 illustrates an embodiment of a connector 1100 in accordance with another embodiment described herein. The connector 1100 can have any one or more similar features and/or attributes as compared with the connector 100 previously described herein. The connector 1100 can include a housing 1102, a boot 1104, and an intermediary element 1106. The housing 1102 can include any one or more similar features as previously described with respect to housing 102. For instance, the housing 1102 can include a latch 1108 extending from a body of the housing 1102. In an embodiment, the latch 1108 can include first and second portions 1110 and 1112. The first and second portions 1110 and 1112 can define spaces for ferrules and/or portions of optical fiber disposed within the housing 1102.

The latch 1108 may be arranged to releasably lock the connector 1100 with a complementary connector device. For example, the connector 1100 may be used with an optical fiber port including mating components (not illustrated) configured to receive and secure the connector 1100 through one or more locking formations 1114 disposed on the latch 1108. In the illustrated embodiment, the locking formation(s) 1114 include ramped surfaces located adjacent to a leading end 1116 of the latch 1108. As described in greater detail herein, the leading end 1116 of the latch 1108 can be spaced apart from the housing 1102, permitting the locking formation(s) 1114 to move relatively closer and farther away from the housing 1102 to lock and unlock the connector 1100 with respect to the optical fiber port. When the leading end 1116 is disposed relatively closer to the housing 1102 it may be in an unlocked configuration. Conversely, when the leading end 1116 is relative farther spaced apart from the housing 1102, the connector 1100 may be in a locked configuration.

The latch 1108 may be engaged with the housing 1102 at a trailing end 1118 of the latch 1108. In an embodiment, the latch 1108 may be integral with the housing 1102. That is, the latch 1108 may be integrally part of the housing 1102. In another embodiment, the latch 1108 may include one or more discrete components configured to be engaged with the housing 1102.

The leading end 1116 of the latch 1108 can be spaced apart from the trailing end 1118 of the latch 1108 by a middle portion 1120 of the latch 1108. In an embodiment, the middle portion 1120 can include a middle portion of the latch 1108 (as viewed from a side view) between 1% and 99% of the length of the latch 1108, such as between 10% and 90% of the length of the latch 1108.

The latch 1108 can generally extend from the housing 1102 in a direction toward the leading end 1116 of the connector 1100. For example, the trailing end 1118 of the latch 1108 may extend from the housing 1102 and at least part of the middle portion 1120 can be oriented in a direction generally toward the leading edge 1122 of the connector 1100. Thus, the leading end 1116 of the latch 1108 may be disposed at a position closer to the leading edge 1122 of the connector 1100 than the trailing end 1118 of the latch 1108. In an embodiment, the latch 1108 can be cantilevered.

In one or more embodiments, the latch 1108 can further include an intermediary engagement member 1124 forming an interface configured to engage with the intermediary element 1106. In an embodiment, the intermediary engagement member 1124 may form a releasable interface with the intermediary element 1106. In such a manner, the intermediary element 1106 can be selectively removable from the latch 1108. In certain instances, the discrete intermediary element 1106 may permit easier formation of the connector 1100 by allowing more complex connector geometry otherwise not possible in certain formation processes, e.g., molding. In the illustrated embodiment, the intermediary engagement member 1124 includes a retention member, e.g., a lip, configured to maintain engagement between the intermediary element 1106 and the intermediary engagement member 1124. In another embodiment, the intermediary element 1106 can be integrally formed with the housing 1102.

Figure 12:
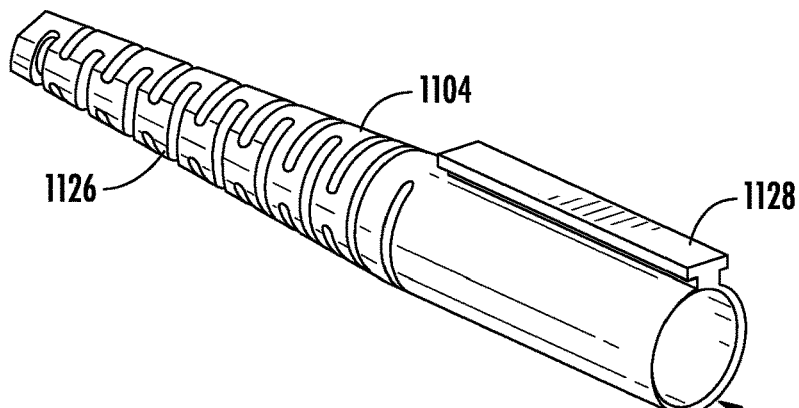
FIG. 12 includes a perspective view of a boot of a connector in accordance with one or more embodiments of the present disclosure.

Referring to FIG. 12, the boot 1104 can include a flexible portion 1126 configured to permit flexure of an optical fiber disposed therein. The boot 1104 can further include a complementary engagement feature 1128 configured to engage with an engagement feature 1130 (FIGS. 13A and 13B) of the intermediary element 1106. By way of example, the complementary engagement feature 1128 can include a projection or recess. The complementary engagement feature 1128 can further include a hook, handle, clip, snap, ridge, channel, knurling, or any other structural features to assist in engagement with the engagement feature 1130 of the intermediary element 1106. In the illustrated embodiment, the complementary engagement feature 1128 is disposed adjacent to a leading edge 1132 of the boot 1104. In another embodiment, the complementary engagement feature 1128 can be spaced apart from the leading edge 1132 of the boot 1104. The complementary engagement feature 1128 can extend toward the flexible portion 1126, e.g., an entire distance between the leading edge 1132 and the flexible portion 1126. In another embodiment, the complementary engagement feature 1128 can be spaced apart from the flexible portion 1126 of the boot 1104.

Figure 13A:
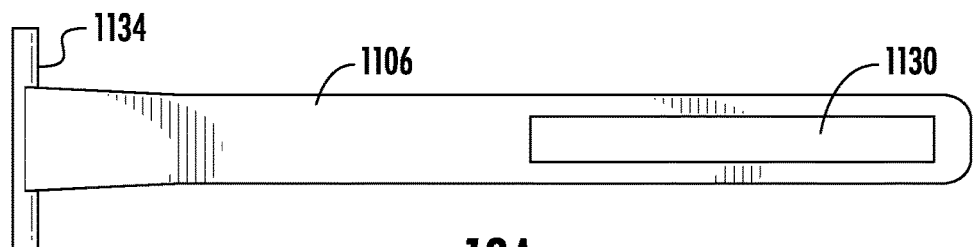
FIGS. 13A and 13B include top views of various embodiments of intermediary elements of a connector in accordance with embodiments of the present disclosure.
Figure 13B:
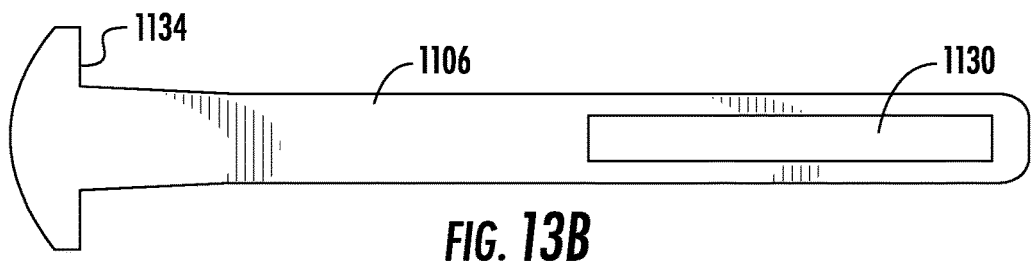

The intermediary element 1106 illustrated in FIGS. 13A and 13B can include an engagement feature 1130 having a shape and/or size configured to engage with the complementary engagement feature 1128 of the boot 1104. For example, the engagement feature 1130 can include an opening extending through the intermediary element 1106 and configured to receive at least a portion of the complementary engagement feature 1128. In certain instances, the complementary engagement feature 1128 of the boot can move relative to the engagement feature 1130 of the intermediary element 1106. For example, the engagement feature 1130 can define a length greater than a length of the complementary engagement feature 1128. In such a manner, the intermediary element 1106 can move without creating biasing pressure against the complementary engagement feature 1128 of the boot 1104.

In an embodiment, the engagement feature 1130 and complementary engagement feature 1128 can be interlocked by interference with one or more features, including for example, one or more of channels, grooves, ridges, projections, castellations, or other known interference features. In the illustrated embodiment of FIGS. 11 to 13B, the complementary engagement feature 1128 includes laterally extending guides which are dimensioned to maintain the complementary engagement feature 1128 within the engagement feature 1130, e.g., opening, of the intermediary element 1106. Use of interference, or another similar type of selectively engageable interface, between the engagement feature 1130 and complementary engagement feature 1128 can allow an operator to assemble the boot 1104 relative to the housing 1102 more easily while still ensuring that the intermediary element 1106 and boot 1104 remain coupled together during operational use of the connector 1100.

The intermediary element 1106 can have a coupling portion 1134 configured to engage with the intermediary engagement member 1124 of the latch 1108. Referring to FIG. 13A, the coupling portion 1134 can include a linear portion, such as a bar, extending transverse to a length of the intermediary element 1106. The bar can engage with the housing at two or more locations along the latch 1108. Referring to FIG. 13B, the coupling portion 1134 can include a reinforced curved portion extending transverse to a length of the intermediary element 1106. The reinforced curved portion can exhibit reduced flexure when the intermediary element 1106 is biased, e.g., from biasing force applied to the boot 1104, thus decreasing the biasing force necessary to unlock the connector 1100 from an optical fiber port.

Figure 14:
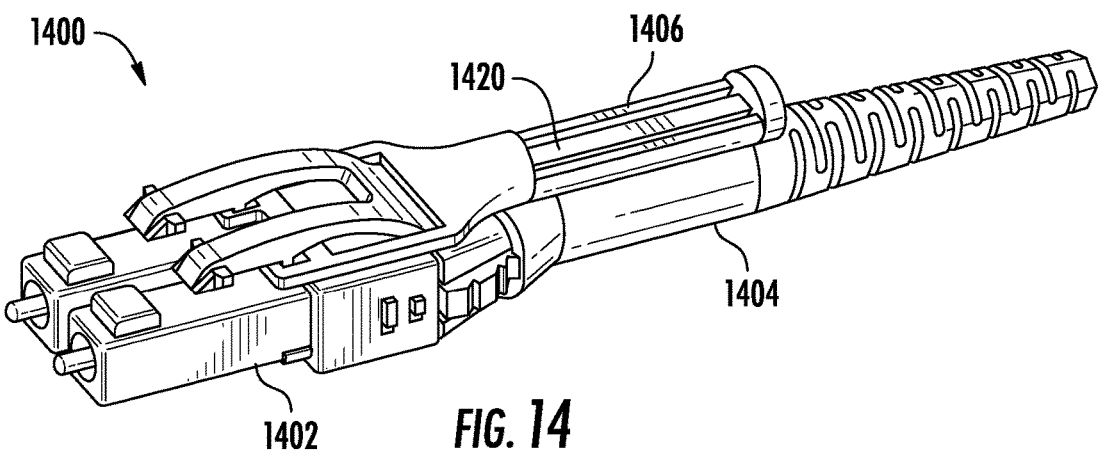
FIG. 14 includes a perspective view of a connector in accordance with one or more embodiments of the present disclosure.
Figure 15:
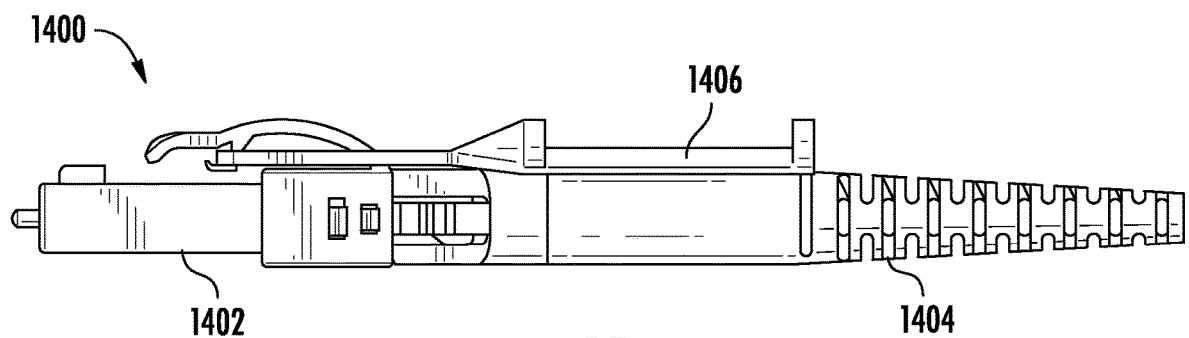
FIG. 15 includes a side elevation view of a connector in accordance with one or more embodiments of the present disclosure.
Figure 16:
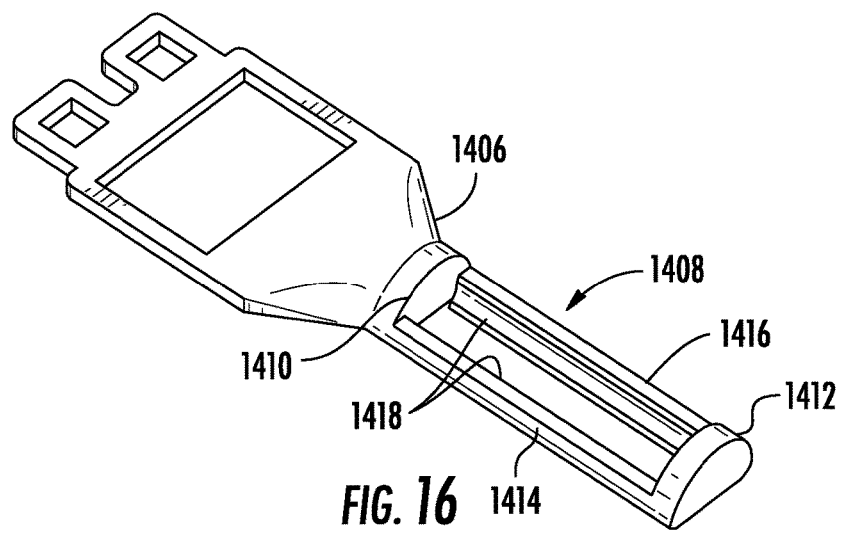
FIG. 16 includes a perspective view of an intermediary element of a connector in accordance with embodiments of the present disclosure.
Figure 17:
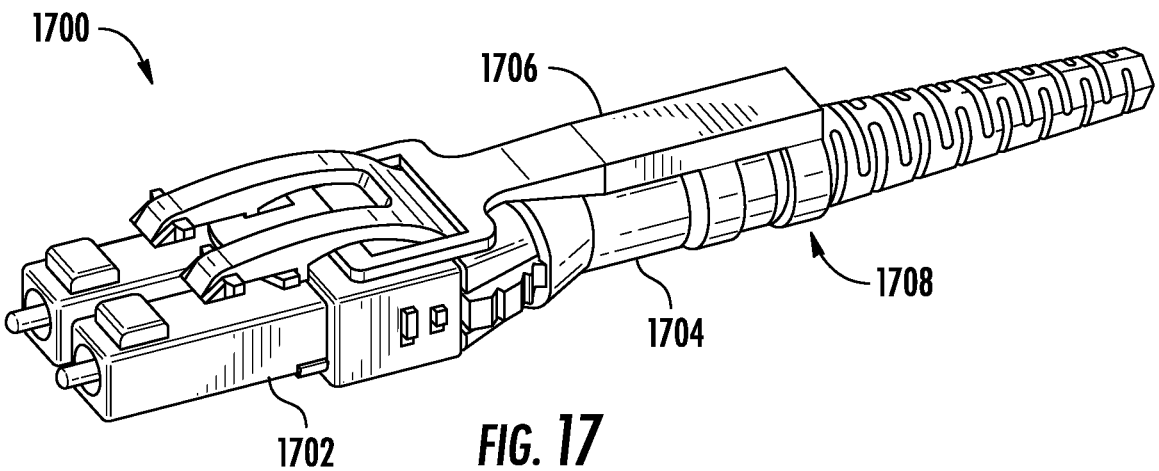
FIG. 17 includes a perspective view of a connector in accordance with one or more embodiments of the present disclosure.
Figure 18:
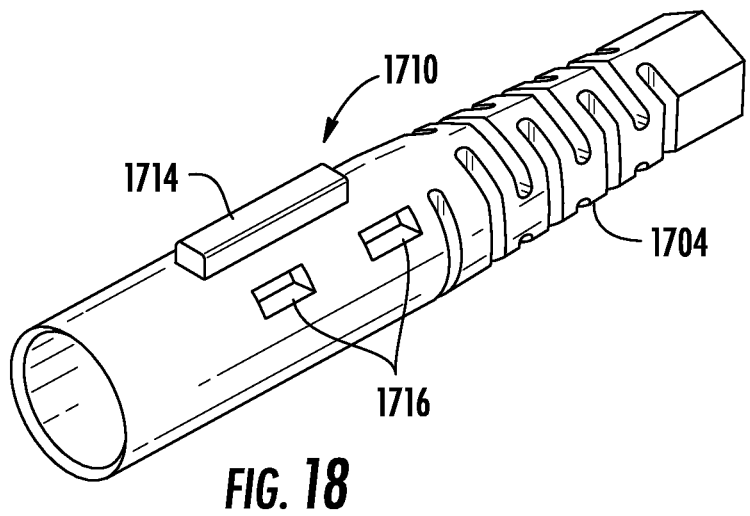
FIG. 18 includes a perspective view of a boot of a connector in accordance with one or more embodiments of the present disclosure.
Figure 19:
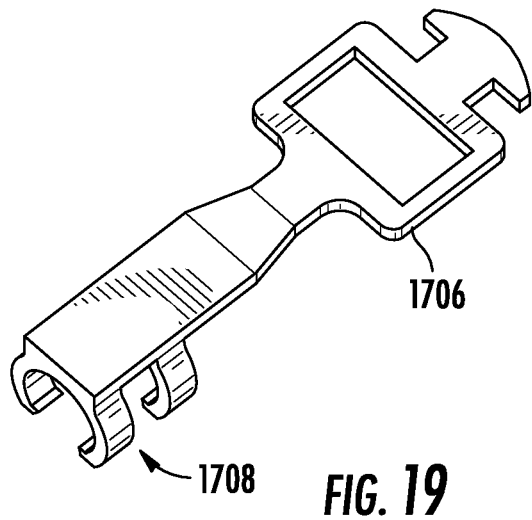
FIG. 19 includes a top perspective view of an intermediary element of a connector in accordance with one or more embodiments of the present disclosure.
Figure 20:
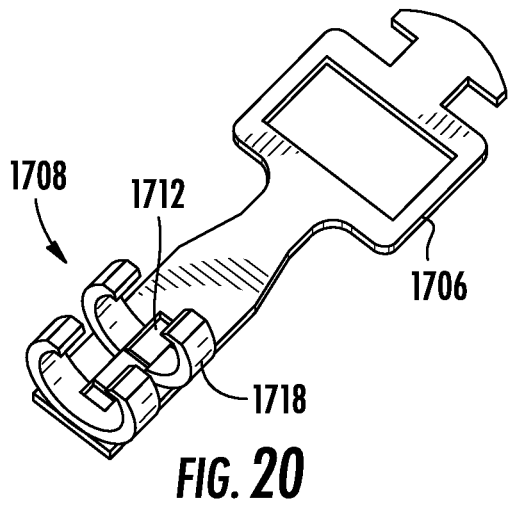
FIG. 20 includes a bottom perspective view of an intermediary element of a connector in accordance with one or more embodiments of the present disclosure.

FIGS. 14 to 16 illustrate a connector 1400 in accordance with another embodiment. The connector 1400 can include one or more of the features of connector 100 and/or connector 1100, such as a housing 1402, a boot 1404, and an intermediary element 1406. In the illustrated embodiment, the intermediary element 1406 includes an engagement feature 1408 having raised leading and trailing portions 1410 and 1412. The raised trailing portion 1412 may provide additional support with a complementary engagement portion 1420 of the boot 1404 to prevent detachment of the intermediary element 1406 from the boot 1404, in particular during locking and unlocking of the connector 1400 from an optical fiber port as described hereinafter. In an embodiment, the intermediary element 1406 can further include raised lateral sides 1414 and 1416. In the illustrated embodiment, the lateral sides 1414 and 1416 define guides 1418 configured to maintain the connection between the intermediary element 1406 and the complementary engagement portion 1420 of the boot 1404.

The intermediary element 1406 can include reinforced portions, e.g., areas with increased thickness or dimensions, to reduce material flexure and decrease the biasing force necessary to unlock the connector 1400 from an optical fiber port.

FIGS. 17 to 20 illustrate a connector 1700 in accordance with another embodiment. The connector 1700 can include one or more of the features of connector 100, connector 1100 and/or connector 1400. In an embodiment, the connector 1700 includes a housing 1702, a boot 1704, and an intermediary element 1706.

The intermediary element 1706 can include an engagement feature 1708 configured to engage with a complementary engagement feature 1710 of the boot 1704. In the illustrated embodiment, the complementary engagement feature 1710 is disposed entirely on the boot 1704. In another embodiment, at least a portion of the complementary engagement feature 1710 can be disposed on the housing 1702. In the illustrated embodiment, the engagement feature 1708 includes a channel 1712 configured to be engaged with a projection 1714 of the complementary engagement feature 1710. In another embodiment, the engagement feature 1708 can include a projection and the complementary engagement feature 1710 can include a channel. In yet further embodiments, the intermediary element 1706 and boot 1704 can include one or more other shaped features configured to be engaged together, e.g., clasps, lips, dimples, ridges, undulating or castellated surfaces, or other elements configured to be engaged together.

In an embodiment, the engagement feature 1710 can further include a secondary interface 1716 configured to be engaged with a secondary interface 1718 of the boot 1704. By way of example, the secondary interfaces 1716 and 1718 can include fingers configured to extend into, e.g., clip with respect to, recesses. For example, in the illustrated embodiment, the secondary interface 1718 of the intermediary element 1706 comprises fingers and the secondary interface 1716 of the boot 1704 comprises recesses configured to engage with the fingers of the intermediary element 1706. The secondary interfaces 1716 and 1718, when coupled together, can act to create a semi-permanent coupling interface between the boot 1704 and the intermediary element 1706, preventing undesired detachment therebetween.

In an embodiment, the secondary interface 1716 of the boot 1704 can be reversible with respect to the secondary interface 1718 of the housing 1702. That is, for example, the secondary interface 1716 can be engageable with the secondary interface 1718 when the boot 1704 is oriented at multiple rotational orientations with respect to the housing 1702. By way of example, the secondary interface 1716 can include one or more centered recesses such that the same fingers can be utilized at the same positions in either rotational orientation of the boot 1704. Alternatively, the secondary interface 1716 can include at least two recesses—a first recess configured to engage the fingers of the secondary interface 1718 in a first rotational orientation and a second recess configured to engage the fingers of the secondary interface 1718 in a second rotational orientation (e.g., 180° opposite the first rotational orientation). In an embodiment, the recess(es) can include a plurality of recesses, such as a plurality of recesses. The number of recesses can correspond with the number of fingers to be engaged therewith.

In an embodiment, the secondary interfaces 1716 and 1718 can function as attachment protocol to prevent unwanted detachment between the boot 1704 and intermediary element 1706 during operation of the connector 1700. That is, the secondary interfaces 1716 and 1718 can maintain operational communication between the channel 1712 of the intermediary element 1706 and the projection 1714 of the boot 1704 (or vise versa), preventing undesired detachment therebetween.

In one or more embodiments, the boot 1704 can be integrally formed with the intermediary element 1706. In an embodiment, the boot 1704 and intermediary element 1706 portions of the integral boot/intermediary element assembly can be formed from different materials. For example, the boot portion of the integral assembly can be formed from a relatively flexible material and the intermediary element portion of the integral assembly can be formed from a relatively less flexible material. The integral assembly may be formed, for example, through overmolding or another multi-material capable process(es).

Figure 21:
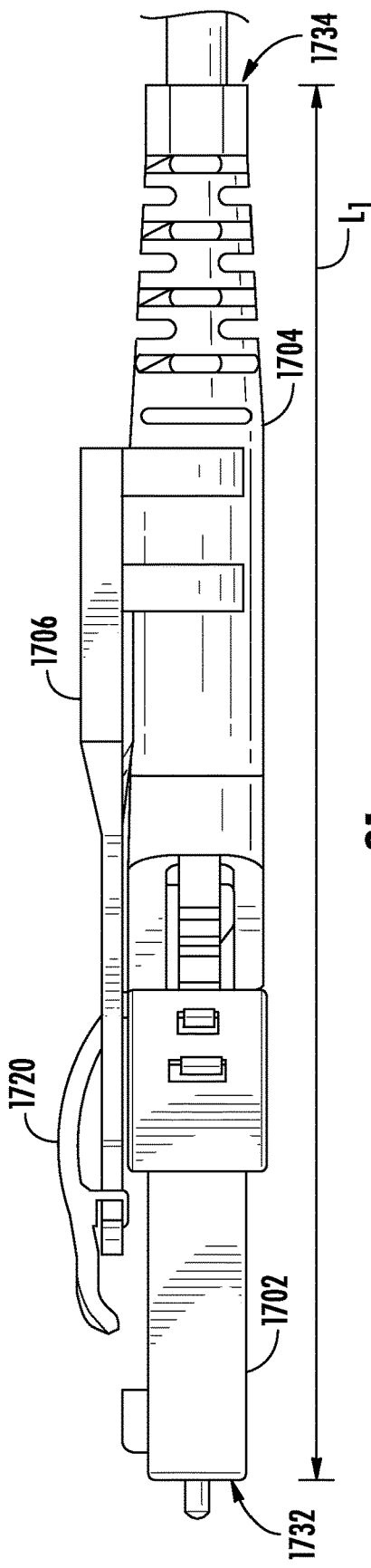
FIG. 21 includes a side view of a connector in a locked configuration in accordance with one or more embodiments of the present disclosure.
Figure 22:
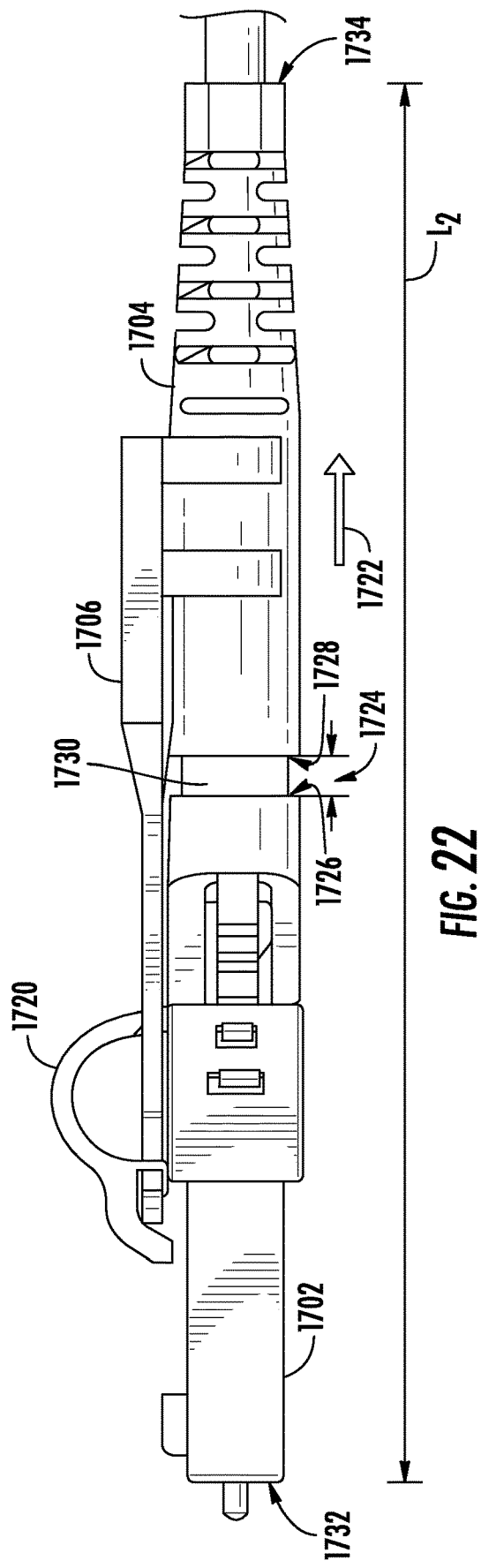
FIG. 22 includes a side view of a connector in an unlocked configuration in accordance with one or more embodiments of the present disclosure.

FIG. 21 shows the connector 1700 in a locked configuration, where a latch 1720 of the housing 1702 is configured to engage with mating components on an optical fiber port. FIG. 22 shows the connector 1700 in an unlocked configuration, where the latch 1720 is disposed at a position such that the connector 1700 can pass freely from the optical fiber port. A user can selectively transition the connector 1700 from the locked configuration to the unlocked configuration by applying a biasing force to the boot 1704 in a direction, such as the direction illustrated by arrow 1722, generally away from the housing 1702.

In an embodiment, the housing 1702 and boot 1704 can be configured to float relative to one another. As used herein, "float" refers to a connection type between the housing 1702 and boot 1704 whereby the two components are coupled together and can be moved relative to one another. For instance, the housing 1702 and boot 1704 can be tracked relative to one another so as to remain coupled together while permitting displacement therebetween along the tracked engagement interface. The housing 1702 and boot 1704 can float relative to one another in the locked configuration and in the unlocked configuration. In one or more embodiments, the housing 1702 and boot 1704 can be selectively fixed together to prevent relative float therebetween. For example, the connector 1700 may include an engageable interconnect (not illustrated) between the housing 1702 and boot 1704 that allows an operator to selectively lock the two components together and prevent displacement of the boot 1704 relative to the housing 1702. In such a manner, the operator can selectively prevent the housing 1702 and boot 1704 from floating relative to each other.

In the unlocked configuration, a gap 1724 can form between a surface 1726 of the housing 1702 and a surface 1728 of the boot 1704. In another embodiment, the gap 1724 may be formed between adjacent portions of the boot 1704 or adjacent portions of the housing 1706. That is, for example, the surfaces 1726 and 1728 can both be part of the boot 1704 or both be part of the housing 1706. In a non-illustrated embodiment, for example, the boot 1704 may include a first portion coupled with the housing 1702 and a second portion that is axially displaceable with respect to the first portion. In such a manner, the operator can open the latch 1720 by applying biasing force to the second portion of the boot 1704.

The gap 1724 can increase in size as the boot 1704 is biased away from the housing 1702. An interfacing portion 1730 can remain disposed between the housing 1702 and boot 1704 when the connector 1700 is in the unlocked configuration in order to prevent axial misalignment between the housing 1702 and boot 1704. The interfacing portion 1730 may be received, for example, in a recess of at least one of the housing 1702 and boot 1704 to restrict transverse movement between the housing 1702 and the boot 1704. In an embodiment, the interfacing portion 1730 can be part of the boot 1704. In another embodiment, the interfacing portion 1730 can be part of the housing 1702. In yet another embodiment, the interfacing portion 1730 can be at least partially formed by the housing 1702 and the boot 1704. In another embodiment, the interfacing portion 1730 can include a discrete component that floats relative to the housing 1702, the boot 1704, or both the housing 1702 and boot 1704. In one or more embodiments, the interfacing portion 1730 or another portion of the connector 1700 can maintain the boot 1704 within a predefined distance from the housing 1702 upon application of biasing force along the boot 1704. Thus, for instance, the boot 1704 and housing 1702 can remain coupled together and cannot be separated upon application of a large force, e.g., an accidental shock force, applied on the boot 1704 in the direction of arrow 1722.

The length, $L_1$, of the connector 1700 in the locked configuration (FIG. 21) as measured between a leading edge 1732 of the connector 1700 and a trailing edge 1734 of the connector 1700, can be different than the length, $L_2$, of the connector 1700 in the unlocked configuration (FIG. 22) as measured between the leading edge 1732 and the trailing edge 1734. In an embodiment, $L_2$ is greater than $L_1$. For example, $L_2$ can be at least 1.01 $L_1$, such as at least 1.02 $L_1$, such as at least 1.03 $L_1$, such as at least 1.04 $L_1$, such as at least 1.05 $L_1$, such as at least 1.075 $L_1$, such as at least 1.1 $L_1$. In one or more embodiments, the change in length between $L_1$ and $L_2$ can be accommodated by a corresponding increase in size of the gap 1730 between the housing 1702 and the boot 1704. While nominal material elasticity may cause slight connector elongation during application of biasing forces along the boot 1704 in certain instances almost all of the length change associated with application of a biasing force along the boot 1704 can correspond with an increased gap 1730 size. For example, at least 75% of the change in length of the connector 1700 can correspond with a change in size of the gap 1730, such as at least 85% of the change in length of the connector 1700 can correspond with a change in size of the gap 1730, such as at least 95% of the change in length of the connector 1700 can correspond with a change in size of the gap 1730, such as at least 99% of the change in length of the connector 1700 can correspond with a change in size of the gap 1730, such as at least 99.9% of the change in length of the connector 1700 can correspond with a change in size of the gap 1730. In a more particular embodiment, the length change of the connector 1700 when moving between locked and unlocked configurations can correspond entirely with the size change of the gap 1730.

In an embodiment, the length of the connector 1700 can increase by at least 0.1 mm when moved from the locked to unlocked configuration, such as by at least 0.5 mm when moved from the locked to unlocked configuration, such as by at least 1 mm when moved from the locked to unlocked configuration, such as by at least 1.5 mm when moved from the locked to unlocked configuration, such as by at least 2 mm when moved from the locked to unlocked configuration, such as by at least 3 mm when moved from the locked to unlocked configuration, such as by at least 5 mm when moved from the locked to unlocked configuration, such as by at least 10 mm when moved from the locked to unlocked configuration.

The connector 1700 may return to the locked configuration upon termination of application of the biasing force on the boot 1704. In one or more embodiments, the connector 1700 can automatically return to the locked configuration upon termination of the application of the biasing force on the boot 1704. For example, in an embodiment, the biasing force transmitted through the boot 1704 can be stored, e.g., in the latch 1720. When the biasing force is terminated, the stored energy can bias the boot 1704 back to a location more proximate to the housing 1702, e.g., the locked configuration. In other embodiments, the connector 1700 may require manual manipulation to switch the connector 1700 to the locked configuration from the unlocked configuration. For instance, the connector 1700 can include one or more clips, detents, snaps, or other similar features which selectively prevent return of the connector 1700 to the locked configuration. In such embodiments, the operator can selectively manipulate the connector 1700 to either release a stored energy or manually move the connector 1700 back to the locked configuration.

Referring now to FIGS. 23 to 27, a connector 2300 in accordance with an embodiment can include an integrated boot 2302 generally including a boot 2304 and a handle 2306 configured to be secured together through an interface, such as interface 2308. The interface 2308 can include complementary engagement features disposed on the boot 2304 and handle 2306, such as for example, a projection 2310 and an opening 2312 configured to receive the projection 2310. In the illustrated embodiment, the projection 2310 is shown as part of the handle 2306 and the opening 2312 as part of the boot 2304. In other embodiments, the projection 2310 can be part of the boot 2304 and the projection 2310 can be part of the handle 2306. In yet further embodiments, the complementary engagement features can include other attachment protocol, including for example, bayonet connections, interference fits, clips, clamps, and the like.

Figure 23:
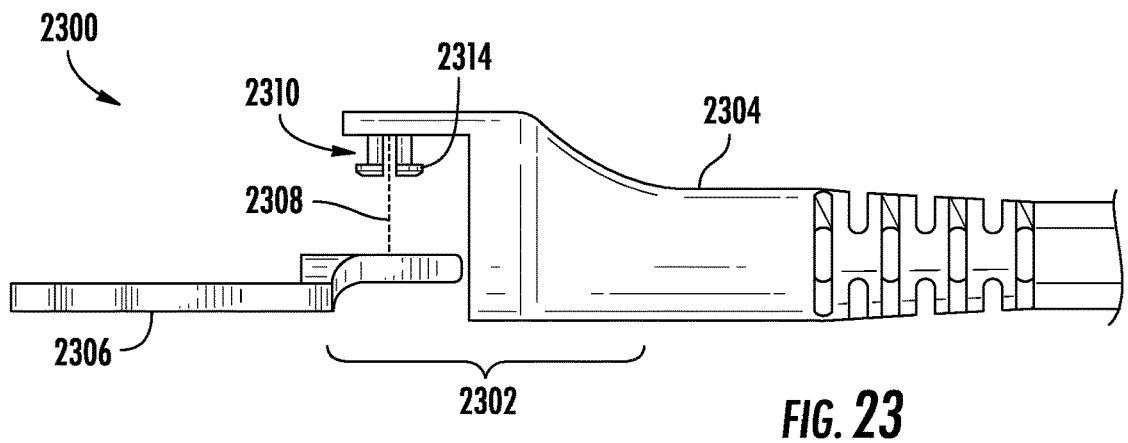
FIG. 23 includes a side view of a connector in an unassembled configuration in accordance with one or more embodiments of the present disclosure.
Figure 24:
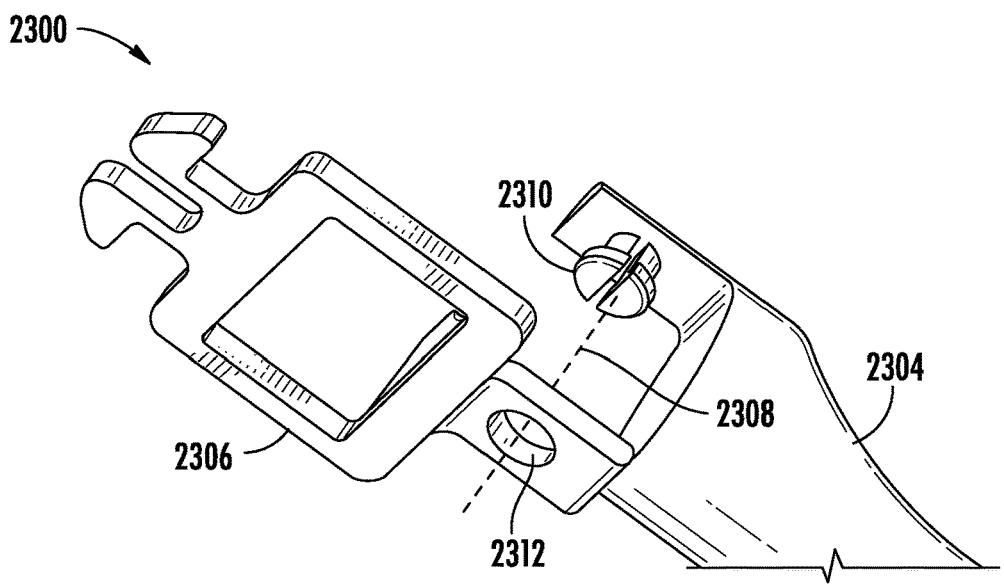
FIG. 24 includes a bottom perspective view of a connector in an unassembled configuration in accordance with one or more embodiments of the present disclosure.

As illustrated in FIGS. 23 and 24, in a particular embodiment the projection 2310 can include a lip 2314 configured to seat relative to a surface of the opening 2312 so as to prevent the projection 2310 from inadvertently pulling therefrom. The lip 2314 can be disposed on a split projection 2310, including for example, two or more axially extending portions spaced apart at least partially by a gap. In such a manner, the split projection 2310 can deform to permit the lip 2314 to pass through the opening 2312 during installation of the integrated boot 2302.

In an embodiment, installation of the boot 2304 and handle 2306 can be performed by translating the boot 2304 and handle 2306 together in a direction generally parallel with the interface 2308. In another embodiment, installation of the boot 2304 and handle 2306 can include rotation and/or pivoting of one or both of the boot 2304 and handle 2306 in combination with, or instead of, translation therebetween.

Figure 25:
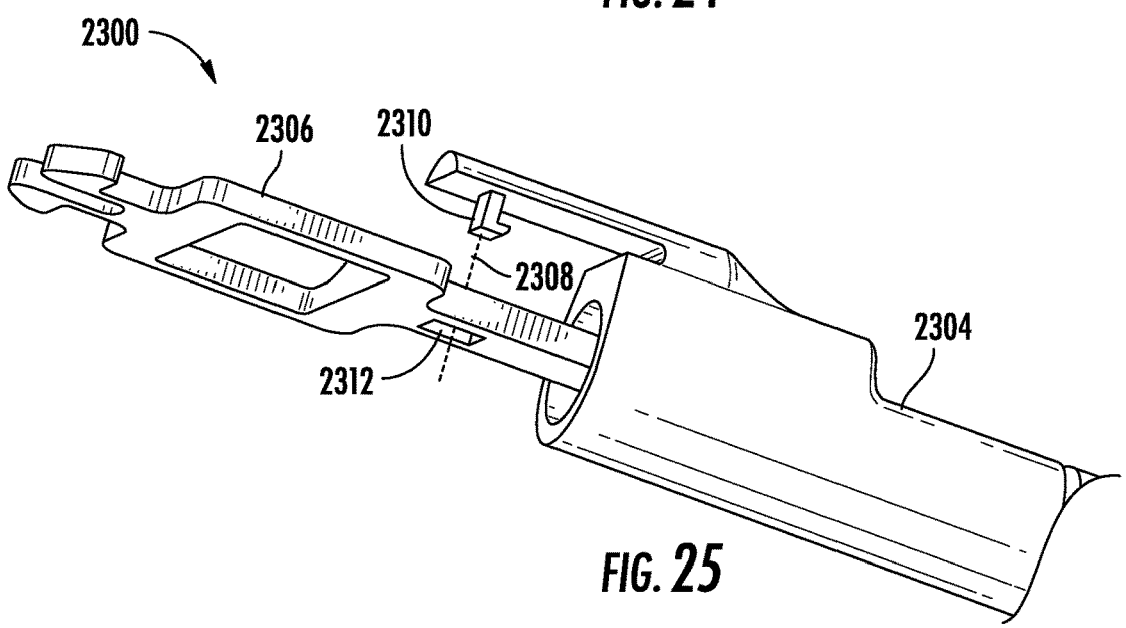
FIG. 25 includes a bottom perspective view of a connector in an unassembled configuration in accordance with one or more embodiments of the present disclosure.

Referring to FIG. 25, in an embodiment, the lip 2314 can be replaced by a flange 2316. The flange 2316 can extend in a direction generally perpendicular to the projection 2310 and engage with the opening 2312. In the illustrated embodiment, the opening 2312 has a generally polygonal shape, e.g., square shape. The opening 2312 can be sized and/or shaped to correspond with the shape of the lip 2314 or flange 2316. In an embodiment, the opening 2312 can define a tight fit with the lip 2314 or flange 2316 so as to prevent undesired detachment therebetween during use.

Figure 26:
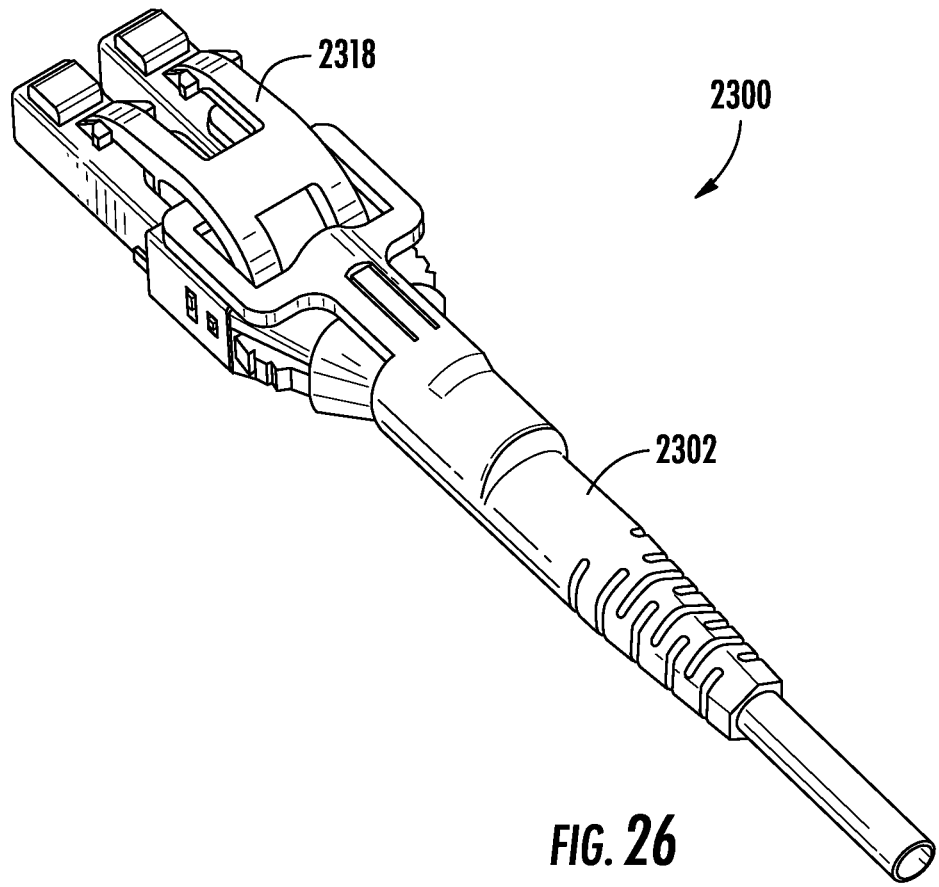
FIG. 26 includes a rear perspective view of a connector in accordance with one or more embodiments of the present disclosure.
Figure 27:
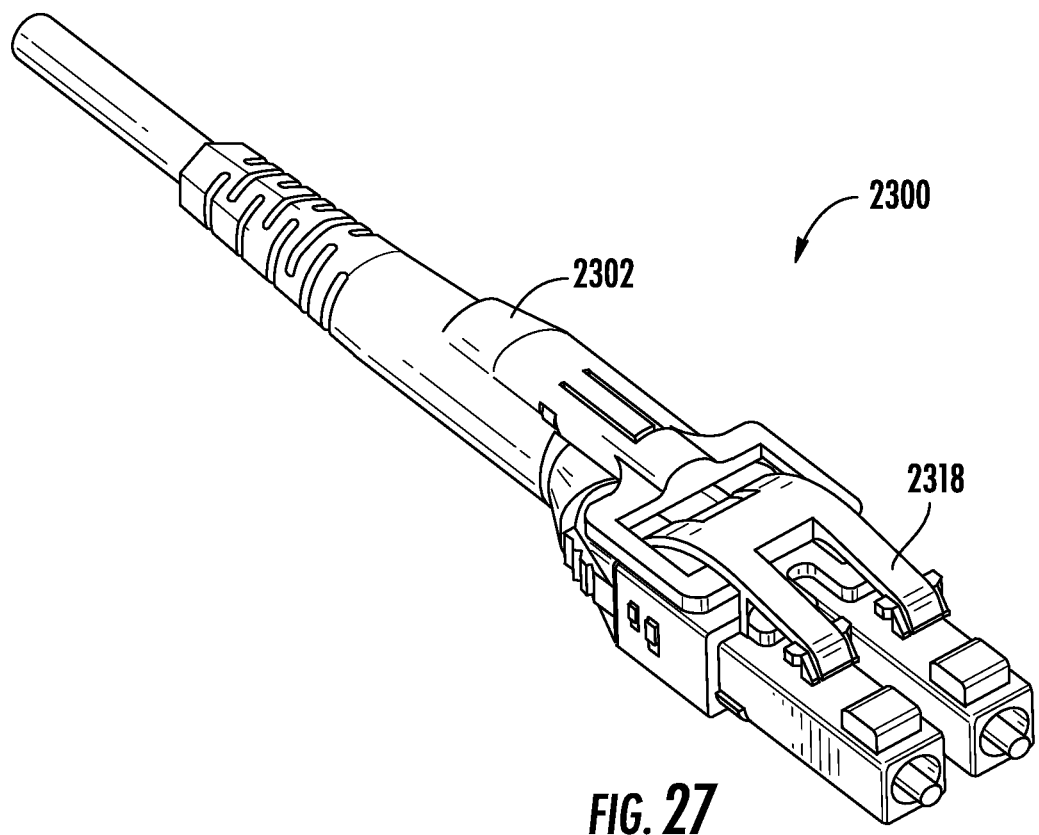
FIG. 27 includes a front perspective view of a connector in accordance with one or more embodiments of the present disclosure.

Referring to FIGS. 26 and 27, the integrated boot 2302 can appear as a single piece in the assembled state. When force is applied along the integrated boot 2302 in a direction generally parallel with arrow A, the integrated boot 2302 can create pressure on a latch 2318 of the connector 2300 to transition the connector 2300 from a locked configuration to an unlocked configuration. Similarly, when application of force is terminated, the latch 2318 can return to the locked configuration as previously described.

Connectors in accordance with one or more embodiments described herein may facilitate easier installation and removal of an optical fiber connector with respect to one or more optical fiber ports. Specifically, installation of the optical fiber connector can include translating the optical fiber connector into the optical fiber port until one or more latches of the connector engage with mating components of the port while removal can be performed by pulling on a handle of the optical fiber connector and pulling the optical fiber connector from the port. Use of a curved latch with locking formation(s) may reduce the force required to disengage the connector from the optical fiber port.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A connector for optically connecting an optical fiber to an optical fiber port, the connector comprising:
    a housing configured to receive the optical fiber;
    a latch coupled to the housing and extending from the housing, wherein the latch is moveable between locked and unlocked positions with respect to the optical fiber port; and
    a handle coupled to the latch, wherein displacing the handle to pull the latch from the locked position to the unlocked position causes a middle portion of the latch to curve away from the housing.

2. The connector of claim 1, wherein at least 25% of a length of the latch lies along a curved line when the latch is in an unbiased state.

3. The connector of claim 2, wherein the curved line has a radius of curvature less than 2 inches (in).

4. The connector of claim 1, wherein the housing is changeable between a standard orientation with a standard polarity and an inverted orientation with a reverse polarity.

5. The connector of claim 1, wherein the latch comprises a leading end spaced apart from a trailing end by a middle portion, and wherein unlocking the latch comprises moving the middle portion of the latch in a direction away from the housing.

6. The connector of claim 5, wherein the leading end of the latch is spaced apart from the housing.

7. The connector of claim 1, wherein the latch comprises a retention member configured to maintain engagement between the handle and the latch, and wherein the retention member extends from the latch in a direction towards the housing.

8. The connector of claim 1, wherein the handle is removably coupled to the latch.

9. The connector of claim 1, wherein the handle comprises one or more openings through which the latch extends.

10. The connector of claim 1, wherein a leading end of the latch comprises a ramp configured to selectively secure the connector to a mating component of the optical fiber port when the connector is in the locked position relative to the optical fiber port.

11. The connector of claim 1, wherein the latch extends from the housing in a direction towards a leading edge of the connector.

12. The connector of claim 1, wherein the latch comprises first and second latches coupled together at a trailing end of the latch.

13. A connector for an optical fiber, the connector comprising:
- a latch extending from a housing of the connector in a direction toward a leading edge of the connector, the latch configured to selectively couple the connector to an optical fiber port;
- a handle coupled to the latch, wherein displacing the handle to pull the latch from the locked position to the unlocked position causes a middle portion of the latch to curve away from the housing, and
- wherein the connector is changeable between a standard orientation with a standard polarity and an inverted orientation with a reverse polarity.

14. The connector of claim 13, wherein at least 50% of the length of the latch lies along the curved line when the latch is unbiased.

15. The connector of claim 13, wherein the latch extends from the housing through an opening in the handle.

16. The connector of claim 13, wherein the handle is configured to be removably coupled to the latch via a handle engagement member of the latch, the handle engagement member extending in a direction towards the housing in a direction transverse to a direction of displacing the handle.

17. The connector of claim 13, wherein a leading end of the latch comprises a ramp configured to selectively secure the connector to a mating component of the optical fiber port when the connector is in a locked position relative to the optical fiber port.

18. The connector of claim 13, wherein the latch defines a first radius of curvature in the locked position and a second radius of curvature in the unlocked position, wherein the first radius of curvature is greater than the second radius of curvature.

19. A method of inverting polarity of a connector coupled to an optical fiber port, the method comprising:
- pulling a handle to move a latch coupled to a housing of the connector, wherein the latch extends toward a leading edge of the connector, and wherein pulling the handle causes the latch to curve away from the housing of the connector such that a middle portion of the latch is furthest from the housing;
- removing the connector from the optical fiber port; and
- inverting the connector between a standard orientation with a standard polarity and an inverted orientation with a reverse polarity.

20. The method of claim 19, further comprising:
- reattaching the connector to the optical fiber port by inserting the connector into the optical fiber port until a locking formation of the connector engages with a mating component of the optical fiber port,
- wherein the latch automatically moves to a locked position upon engaging with the mating component.

* * * * *